US010461682B2

United States Patent
Schuit et al.

(10) Patent No.: US 10,461,682 B2
(45) Date of Patent: Oct. 29, 2019

(54) HEIGHT ADJUSTABLE SOLAR PANEL MOUNTING ASSEMBLY

(71) Applicant: Unirac, Inc., Albuquerque, NM (US)

(72) Inventors: Nathan Schuit, Edgewood, NM (US); Jason Mayfield, Albuquerque, NM (US); Klaus Nicolaedis, Albuquerque, NM (US); Todd Ganshaw, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 74 days.

(21) Appl. No.: 15/138,018

(22) Filed: Apr. 25, 2016

(65) Prior Publication Data

US 2017/0040931 A1 Feb. 9, 2017

Related U.S. Application Data

(60) Provisional application No. 62/217,580, filed on Sep. 11, 2015, provisional application No. 62/200,262, filed on Aug. 3, 2015.

(51) Int. Cl.
*H02S 20/23* (2014.01)
*F24S 25/632* (2018.01)
*F24S 25/636* (2018.01)
*F24S 25/00* (2018.01)

(52) U.S. Cl.
CPC ............ *H02S 20/23* (2014.12); *F24S 25/632* (2018.05); *F24S 25/636* (2018.05); *F24S 2025/019* (2018.05); *Y02B 10/12* (2013.01); *Y02B 10/20* (2013.01); *Y02E 10/47* (2013.01)

(58) Field of Classification Search
CPC ....... H02S 20/23; F24S 25/636; F24S 25/632; F24S 2025/019; F24J 25/203

USPC .................................. 136/242–265; 52/173.3
See application file for complete search history.

(56) References Cited

U.S. PATENT DOCUMENTS

| | | |
|---|---|---|
| D30,898 S | 5/1899 | Paine |
| 3,042,068 A | 7/1962 | Smith |
| 3,269,228 A | 8/1966 | Mack |
| 4,436,005 A | 3/1984 | Hanson |
| D276,879 S | 12/1984 | Bell |
| 4,822,223 A | 4/1989 | Williams |
| 5,728,136 A | 3/1998 | Thal |
| 5,820,092 A | 10/1998 | Thaler |
| 5,927,921 A | 7/1999 | Hukari |

(Continued)

FOREIGN PATENT DOCUMENTS

| | | |
|---|---|---|
| JP | 2000-345664 A | 12/2000 |
| WO | WO2013033404 | 3/2013 |

OTHER PUBLICATIONS

U.S. Patent Application, "Hybrid Solar Panel Mounting Assembly", filed Apr. 25, 2016, Inventor Nathan Schuit et al.

(Continued)

*Primary Examiner* — Eli S Mekhlin
*Assistant Examiner* — Kourtney R S Carlson
(74) *Attorney, Agent, or Firm* — Lee & Hayes, P.C.

(57) ABSTRACT

An apparatus and method for mounting a solar panel in a solar panel mounting assembly is disclosed. The solar panel mounting assembly includes a mounting bracket and a helical drive, where the mounting bracket is vertically adjustable by the helical drive. The helical drive engages with a stanchion that is variably positioned along a base member that is fixed to a roof.

33 Claims, 48 Drawing Sheets

(56) References Cited

U.S. PATENT DOCUMENTS

| | | |
|---|---|---|
| 6,361,258 B1 | 3/2002 | Heesch |
| 6,367,258 B1 | 4/2002 | Wen et al. |
| 6,387,129 B2 | 5/2002 | Rieser et al. |
| 6,457,923 B1 | 10/2002 | Grossman |
| 6,478,518 B1 | 11/2002 | Hwang |
| 6,540,750 B2 | 4/2003 | Burkhart |
| D588,893 S | 3/2009 | Radich |
| D613,594 S | 4/2010 | Huang |
| D613,595 S | 4/2010 | Huang |
| 7,981,143 B2 | 7/2011 | Doubler et al. |
| 8,109,048 B2 | 2/2012 | West et al. |
| 8,272,174 B2 | 9/2012 | Stearns et al. |
| 8,353,650 B2 | 1/2013 | Wiley et al. |
| 8,375,645 B2 | 2/2013 | Iwauchi et al. |
| D691,033 S | 10/2013 | Allman |
| 8,567,154 B2 | 10/2013 | Babineau, Jr. et al. |
| 8,622,677 B2 | 1/2014 | Wu et al. |
| D698,637 S | 2/2014 | Su |
| 8,683,761 B2 | 4/2014 | Danning |
| 8,695,290 B1 | 4/2014 | Kim et al. |
| 8,752,338 B2 | 6/2014 | Schaefer et al. |
| 8,806,813 B2 | 8/2014 | Plaisted et al. |
| D713,243 S | 9/2014 | Hsu |
| 8,919,053 B2 | 12/2014 | West |
| D721,423 S | 1/2015 | Jacques et al. |
| 8,935,893 B2 | 1/2015 | Liu et al. |
| 8,938,932 B1 | 1/2015 | Wentworth et al. |
| 8,943,765 B2 | 2/2015 | Danning et al. |
| 9,004,836 B2 | 4/2015 | Wells et al. |
| 9,010,041 B2 | 4/2015 | Danning |
| 9,076,899 B2 | 7/2015 | Schrock |
| 9,080,792 B2 | 7/2015 | Patton et al. |
| 9,097,443 B2 | 8/2015 | Liu et al. |
| D740,866 S | 10/2015 | Herrmann et al. |
| 9,166,524 B2 | 10/2015 | West et al. |
| D759,464 S | 6/2016 | West |
| 9,413,286 B2 | 8/2016 | Danning |
| 9,431,953 B2 | 8/2016 | Stearns et al. |
| 9,455,662 B2 | 9/2016 | Meine |
| 9,473,066 B2 | 10/2016 | Stephan et al. |
| D779,308 S | 2/2017 | West et al. |
| 9,647,433 B2 | 5/2017 | Meine et al. |
| D788,574 S | 6/2017 | Baiz et al. |
| 9,698,724 B2 | 7/2017 | West et al. |
| 9,712,106 B2 | 7/2017 | Wentworth et al. |
| 9,755,572 B2 | 9/2017 | Wentworth et al. |
| D800,544 S | 10/2017 | Schuit et al. |
| 9,800,199 B2 | 10/2017 | Meine et al. |
| D803,664 S | 11/2017 | West et al. |
| 9,813,012 B2 | 11/2017 | Wentworth et al. |
| 9,825,581 B2 | 11/2017 | Wildes |
| D807,419 S | 1/2018 | Herrmann et al. |
| 2006/0039775 A1 | 2/2006 | Mizuno et al. |
| 2008/0053517 A1 | 3/2008 | Plaisted et al. |
| 2008/0067808 A1* | 3/2008 | Poddar .................. F16L 15/08 285/92 |
| 2011/0000519 A1 | 1/2011 | West |
| 2011/0000544 A1 | 1/2011 | West |
| 2011/0203637 A1 | 8/2011 | Patton et al. |
| 2011/0260027 A1 | 10/2011 | Farnham, Jr. |
| 2012/0102853 A1 | 5/2012 | Rizzo |
| 2012/0102854 A1 | 5/2012 | Meier et al. |
| 2012/0192926 A1 | 8/2012 | Kambara et al. |
| 2012/0234378 A1 | 9/2012 | West et al. |
| 2012/0298817 A1 | 11/2012 | West et al. |
| 2012/0301661 A1 | 11/2012 | West et al. |
| 2012/0318322 A1 | 12/2012 | Lanyon et al. |
| 2013/0048815 A1 | 2/2013 | Wagner et al. |
| 2013/0048816 A1 | 2/2013 | Wentworth et al. |
| 2014/0109954 A1 | 4/2014 | Kanbara et al. |
| 2014/0158184 A1 | 6/2014 | West et al. |
| 2014/0175244 A1 | 6/2014 | West et al. |
| 2015/0013237 A1 | 1/2015 | Schaefer et al. |
| 2015/0034355 A1* | 2/2015 | Patton .................. F24S 25/61 174/78 |
| 2015/0068590 A1 | 3/2015 | West et al. |
| 2015/0129517 A1 | 5/2015 | Wildes |
| 2015/0168021 A1 | 6/2015 | Wentworth et al. |
| 2015/0188483 A1 | 7/2015 | Nishio |
| 2015/0204583 A1 | 7/2015 | Stephan et al. |
| 2015/0280638 A1 | 10/2015 | Stephan et al. |
| 2015/0288320 A1 | 10/2015 | Stearns et al. |
| 2016/0111996 A1 | 4/2016 | Stephan et al. |
| 2016/0126884 A1 | 5/2016 | Stearns et al. |
| 2016/0218661 A1 | 7/2016 | Meine |
| 2016/0244308 A1 | 8/2016 | Thomas et al. |
| 2016/0268958 A1 | 9/2016 | Wildes et al. |
| 2016/0268959 A1 | 9/2016 | Meine et al. |
| 2016/0344334 A1 | 11/2016 | Danning |
| 2017/0063288 A1 | 3/2017 | Schuit et al. |
| 2017/0063300 A1 | 3/2017 | Ash |
| 2017/0104442 A1 | 4/2017 | MacRostie et al. |
| 2017/0155356 A1 | 6/2017 | Schuit et al. |
| 2017/0299102 A1 | 10/2017 | Ash et al. |
| 2017/0302221 A1 | 10/2017 | Jasmin |
| 2017/0366131 A1 | 12/2017 | Stearns et al. |

OTHER PUBLICATIONS

PCT/US16/45150, International Search Report (PCT/ISA/220 and PCT/ISA/210) dated Dec. 16, 2016, enclosing Written Opinion of the International Searching Authority (PCT/ISA/237) (Fifteen (15) pages).

International Preliminary Report on Patentability (PCT/IB/338 & PCT/IB/373) issued in PCT Application No. PCT/US2016/045150 dated Feb. 6, 2018, including English translation of document C2 (Japanese-language Written Opinion (PCT/ISA/327 previously filed on (Jan. 4, 2017)) (eleven (11) pages).

U.S. Appl. No. 15/352,489, " Hybrid Solar Panel Mounting Assembly With a Tilted Ledge", filed Nov. 15, 2016, Inventor Nathan Schuit et al.

Non Final Office Action dated Feb. 6, 2019 for U.S. Appl. No. 15/352,494 "Height Adjustable Solor Panel Mounting Assembly with an Assymetric Lower Bracket" Schuit, 12 pages.

Office Action for U.S. Appl. No. 15/352,489, dated Oct. 28, 2019, Schuit, "Hybrid Solar Panel Mounting Assembly with a Tilted Ledge ", 11 pages.

http://www.bing.com/images/search?a=security+nut&view=detailv2&&id=4C2424531230A169ADC4DAE0F4EB8EC124253035&selectedIndex=0&ccid=ZLH08zqK&simid=608029617595547726&thid=OIP.M64b1f4f33aBaedc8c63521a0138a6f19o0&ajahist=0, 1 page, retrieved Apr. 1, 2016.

http://www.bing.com/images/search?a=square+socket&view=detailv2&&id=1 D509F9A8DFCBBB4B007C1 E258779F74779A67B&selectedIndex=146&ccid=TiaND%2fol&simid=608049464641849402&thid=OIP.M43568dOffa089a0070579d68bf010e9boO&ajaxhist=0, 1 page, retrieved Apr. 1, 2016.

https://www.bing.com/images/search?a=tri+drive+nut&view=detailv2&id=80C4DD5253315F30F57D86911690DC49F0400179&selectedindex=31&thid=OIP.M71b0fb5db053c5ecc513dba6b6e2490f0o0&ajaxhist=0&exph=0&expw=0&vt=0&eim=1, 1 page, retrieved Apr. 1, 2016.

http://www.bing.com/images/search?a=tri+drive+nut&view=detailv2&&id=80C4DD5253315F30F57D6691690DC49F0400179&selectedindex=31&ccid=cbD7XbBT&simid=608041072270839485&thid=OIP.M71b0f5bd053c5ecc513da6b6e2490f0o0&ajaxhist=0, 1 page, retreived Apr. 1, 2016.

http://www.bing.com/images/search?a=tri+drive+screw&view=detailv2&&id=DD12BF8073DE72013323056059182C6D86E91F969&selectedindex=30&ccid=j57ZZKxh&simid=607989846202122750&thid=OIP.M8f9ed964ac61774bd32abaf184c076cdo0&ajaxhist=0, 1 page, retrieved Apr. 1, 2016.

http://www.bing.com/images/search?a=tri-drive+socket&view=detailv2&&id=6FAC151036BABE696377D989C28380E64C9C21A2&selectedIndex=121&ccid=nm2PL70D&smid=608022930330814765&thid=OIP.

(56) References Cited

OTHER PUBLICATIONS

M9e6d8fbd03832c834a197be6934bf1o0&ajahist=0, 1 page, retrieved Apr. 1, 2016.

\* cited by examiner

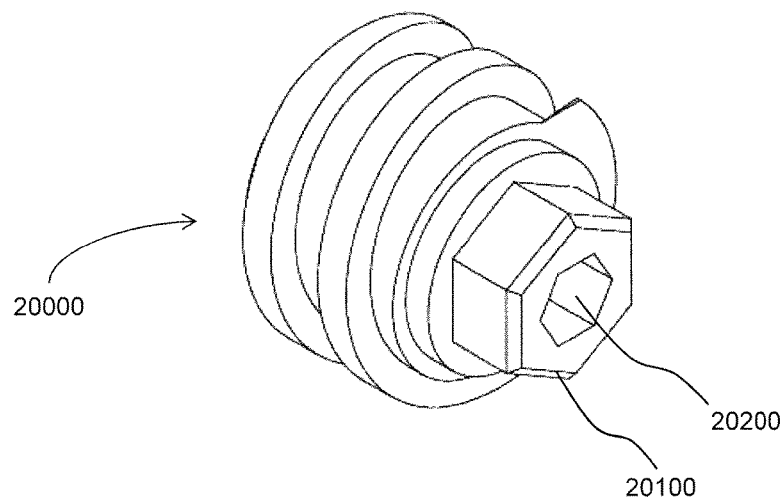
FIG. 58A
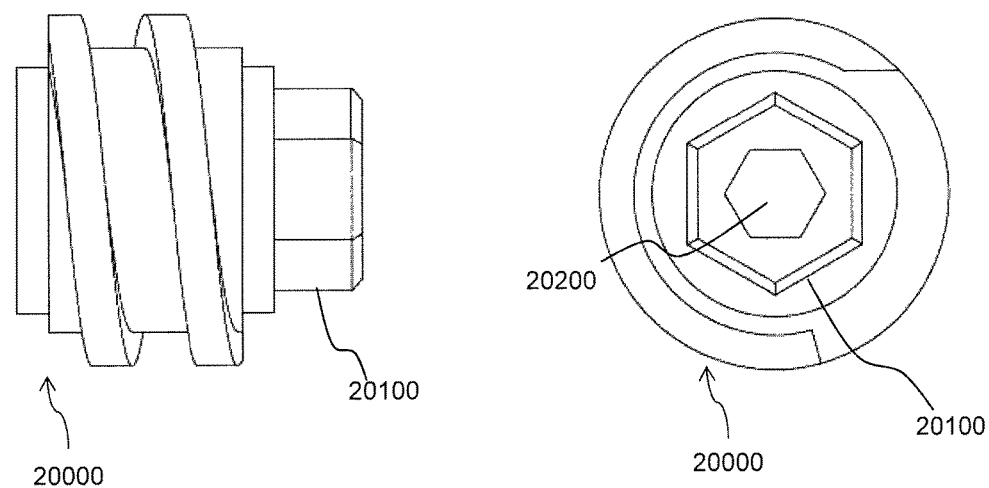
FIG. 58B
FIG. 58C

HEIGHT ADJUSTABLE SOLAR PANEL MOUNTING ASSEMBLY

This application claims the benefit of U.S. Provisional Application No. 62/200,262, filed Aug. 3, 2015, and U.S. Provisional Application No. 62/217,580, filed Sep. 11, 2015, the disclosures of which are expressly incorporated by reference herein.

BACKGROUND OF THE INVENTION

The solar industry is growing world-wide and, as a result, more-efficient structures are desirable for mounting photovoltaic modules to a structure, such as a roof of a home or other building. Whereas many different structures are known, there is a desire to reduce the complexity of such structures, and improve the efficiency of such structures.

Therefore, there is a need for an improved apparatus for mounting photovoltaic modules.

BRIEF DESCRIPTION OF THE DRAWINGS

FIGS. 58A-C illustrate a fifth embodiment of a helical drive in accordance with the principles of the present invention.

DETAILED DESCRIPTION OF THE DRAWINGS

Figure 1:
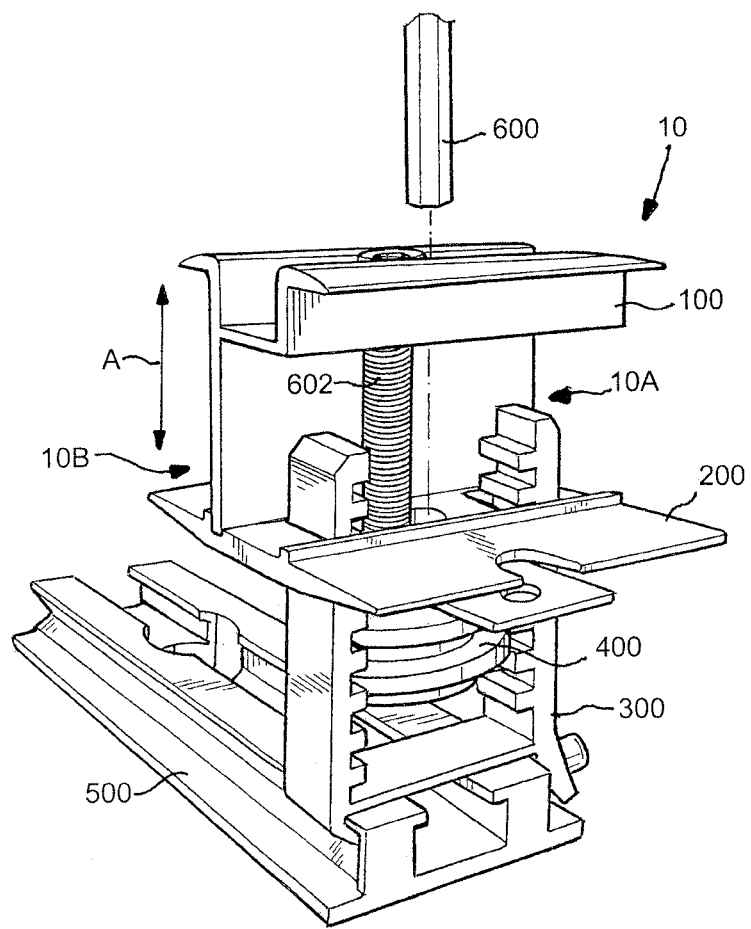
FIGS. 1-4 are perspective views of a first embodiment of a height adjustable solar panel mounting assembly in accordance with the principles of the present invention.

The term "vertical" is defined as meaning substantially perpendicular to a roof when the mounting assembly is mounted on the roof and to base 500. FIGS. 1-5 illustrate a first embodiment of a height adjustable solar panel mounting assembly 10 in accordance with the principles of the present invention.

As can be seen, and as will be discussed further later in this specification, the assembly 10 includes an upper bracket 100, a lower bracket 200 (which together form a mounting bracket for mounting solar panels), a stanchion (tower) 300, a helical drive 400, and a base 500. Upper bracket 100 and lower bracket 200 define first slot 10A and second slot 10B between them. The frame of one solar panel, or two adjacent solar panels, can be mounted in first slot 10A and, likewise, the frame of one solar panel, or two adjacent solar panels, can also be mounted in second slot 10B.

Figure 2:
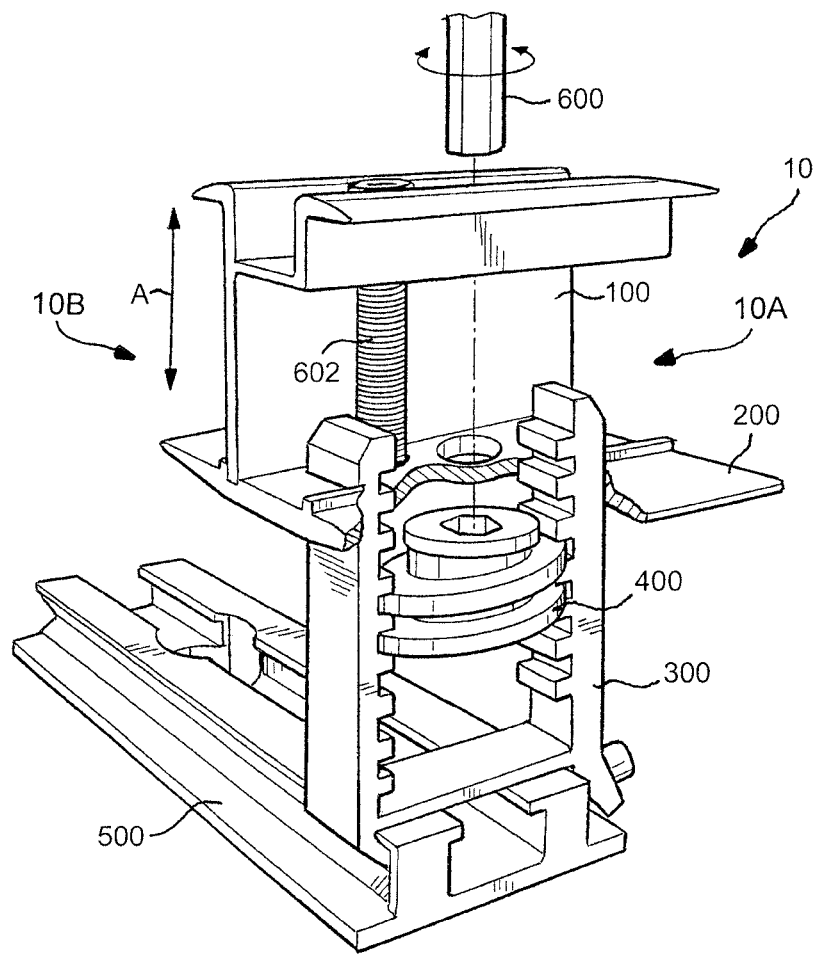
Figure 3:
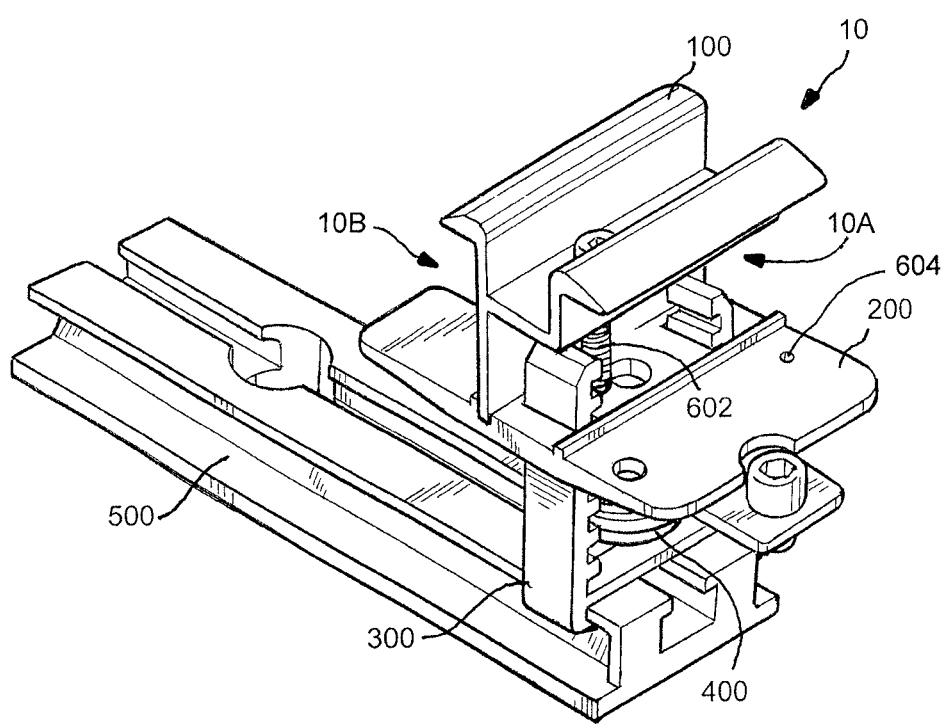
Figure 4:
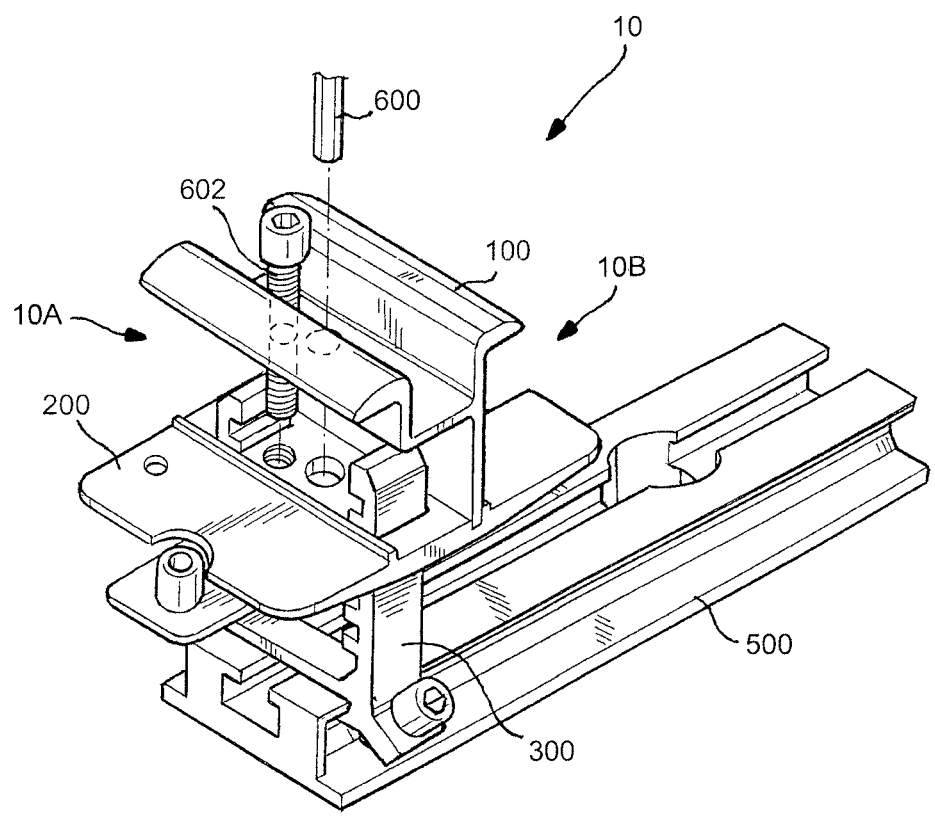
Figure 5:
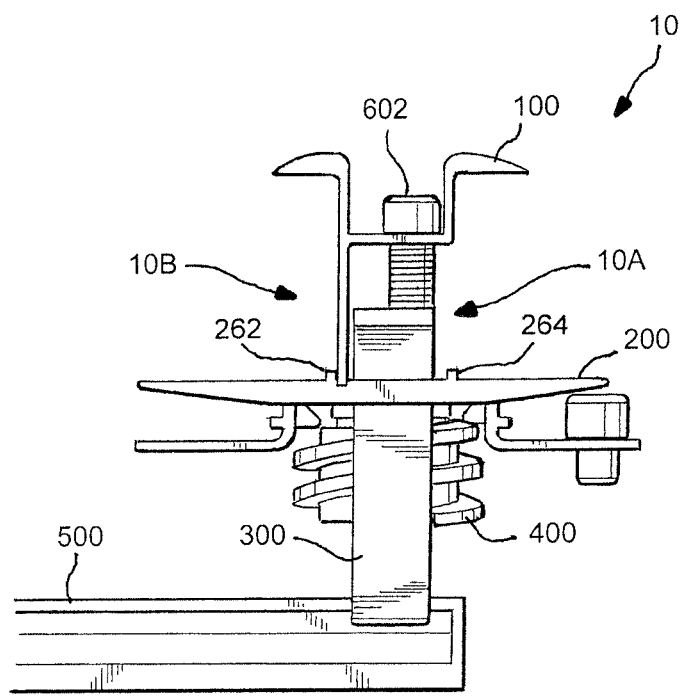
FIG. 5 is a side view of the assembly of FIGS. 1-4.

Upper bracket 100 and lower bracket 200 are moveable in a vertical direction A on stanchion 300, and thus, their height with respect to base 500, and stanchion 300, is adjustable. To move the upper bracket 100 and lower bracket 200 vertically, and thus, to adjust the height of these brackets, the helical drive 400 is movably mounted on the stanchion 300 where grooves and teeth of the helical drive 400 engage with teeth and grooves on the stanchion 300, respectively. By rotating the helical drive 400, the helical drive can move on the teeth on the stanchion 300 in an up or down direction; where rotation in a first direction raises the helical drive and rotation in an opposite direction lowers the helical drive. The movement of the helical drive 400 in-turn respectively raises or lowers the upper bracket 100 and lower bracket 200 since the brackets are either coupled to the helical drive, or are supported by the helical drive, such that the movement of the helical drive also causes the upper bracket and the lower bracket to move accordingly. A tool 600 that engages with the helical drive 400 can be used to rotate the drive. FIG. 2 provides a cut-away view to further illustrate the helical drive 400 with respect to the other components of the assembly 10 and the tool 600.

Helical drive 400 resides lower than (completely below) the plane of lower bracket 200, and completely below the top of stanchion 300. In an embodiment, the range of vertical height adjustment (vertical movement) can be as much as 1", which results from 3.3 revolutions of helical drive 400 when the pitch equals 0.3 inches/thread. The helical drive's inner diameter can be 0.8" and the outer diameter can be 1.0", and the total vertical length can be 0.83". In other embodiments, the helical drive thread pitch can range from 0.1 to 1.0 inches/thread. Helical drive 400 can have an aspect ratio, L/D (vertical length/outer diameter) that ranges from 0.8 to 1.2. Helical drive 400 can have an aspect ratio of inner-to-outer diameter, $D_i/D_o$, that ranges from 0.5 to 0.9. Helical drive 400 is not permanently attached to anything; it is free to move about in-between the arms of stanchion 300. The use of coarse threads (as compared to fine threads) for drive 400 gives the installer the ability to adjust the height of assembly 10 significantly faster than if drive 400 has fine threads.

The base 500 is mounted on a surface, such as a roof of a house or other building, on which the solar panels are to be mounted. Stanchion 300 is variably positioned along the length of base 500, and is secured by tightening a securement device to mount stanchion 300 on base 500.

Thus, as can be understood, through the use of a movable helical drive in the solar panel mounting assembly, the mounting bracket of the assembly for a solar panel can be vertically adjusted with respect to the surface on which the mounting assembly is mounted before or after the solar panels have been installed in the assembly.

The individual components of the first embodiment of the height adjustable solar panel mounting assembly 10 of FIGS. 1-5 will now be further discussed below.

Figure 6:
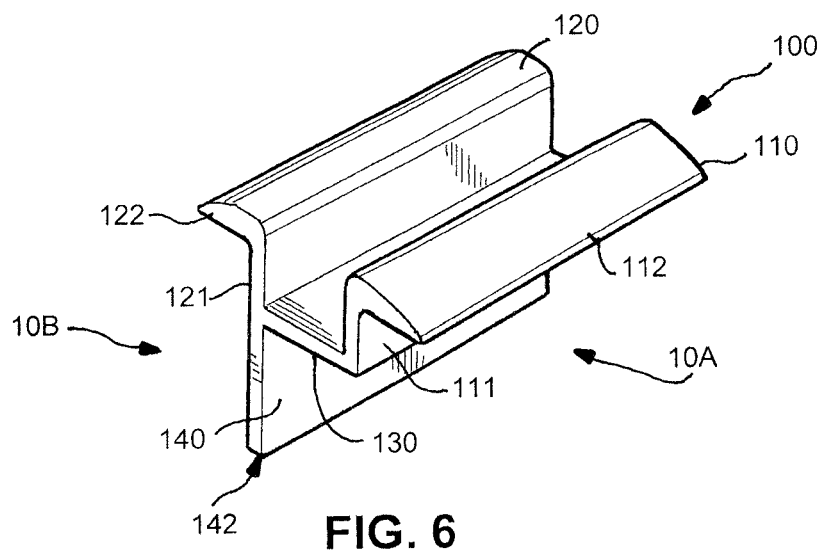
FIG. 6 is a perspective view of a first embodiment of an upper bracket of the embodiment of FIGS. 1-5.
Figure 7:
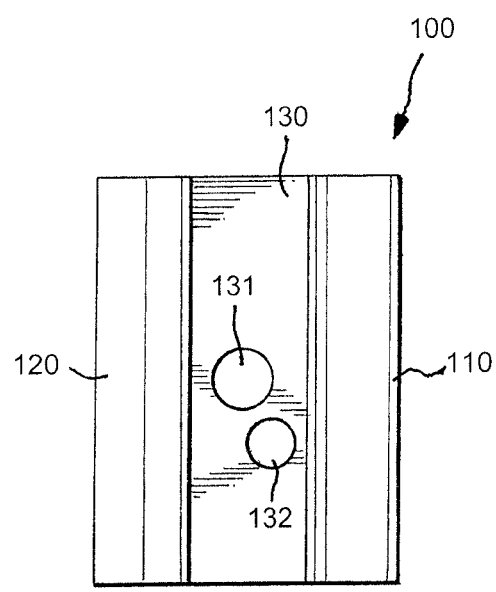
FIG. 7 is a top view of the upper bracket of FIG. 6.

FIGS. 6 and 7 illustrate a first embodiment of an upper bracket. Upper bracket 100 includes a first arm 110, a second arm 120, a base 130, and a bottom wall 140. First arm 110 includes a vertical wall 111 that extends vertically from base 130 and a horizontal ledge 112 that extends horizontally from vertical wall 111. Horizontal ledge 112 is the structure that defines the upper portion of slot 10A that receives a solar panel(s). Optionally, upper bracket 100 can be a Unirac Mid-Clamp or Unirac End-Clamp design, such as described in U.S. Pat. Nos. 9,160,273 and 9,057,542, the disclosures of which are expressly incorporated by reference herein.

Second arm 120 also includes a vertical wall 121 that extends vertically from base 130 and a horizontal ledge 122 that extends horizontally from vertical wall 112. Horizontal ledge 122 is the structure that defines the upper portion of slot 10B that receives a solar panel(s).

Base 130 defines a first aperture 131 and a second aperture 132, which are disposed between first arm 110 and second arm 120. The tool 600 that is used to rotate helical drive 400 is insertable through first aperture 131 to extend through base 130, and thus through upper bracket 100, and ultimately into helical drive 400. Second aperture 132 receives a bolt 602 through it, which can be seen in FIGS. 1-5, the purpose of such bolt will be described later in this specification.

Bottom wall 140 extends vertically below base 130. As will be further discussed, the lower edge 142 of bottom wall 140 is received within a slot 235 of the lower bracket 200 to mount the upper bracket 100 on the lower bracket 200.

Figure 8:
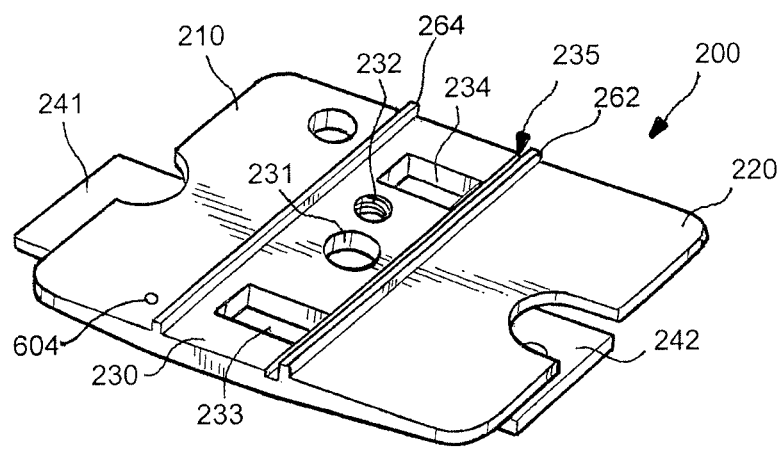
FIG. 8 is a perspective view of a first embodiment of a lower bracket of the embodiment of FIGS. 1-5.
Figure 9:
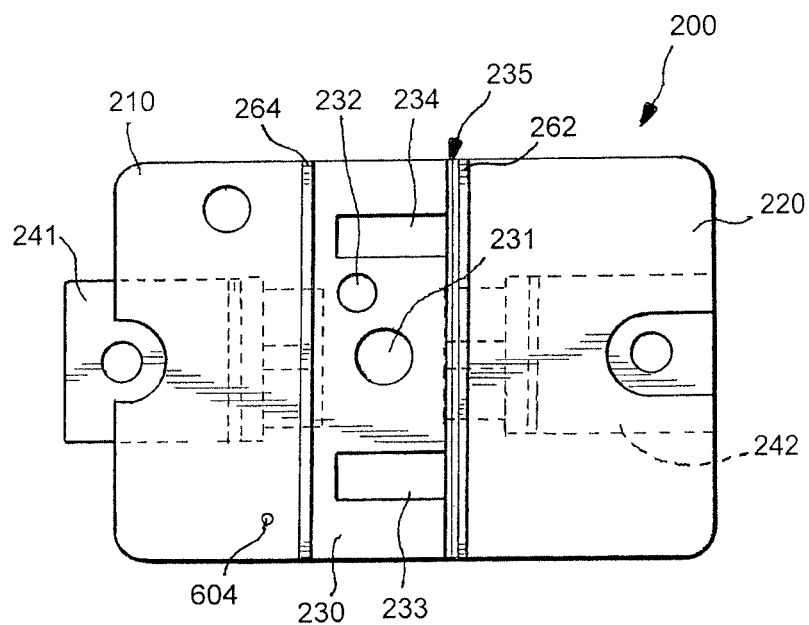
FIG. 9 is a top view of the lower bracket of FIG. 8.
Figure 10:
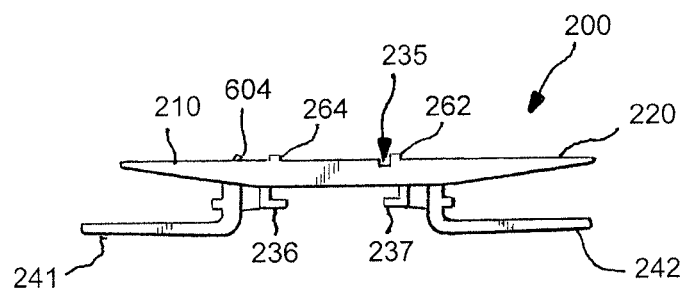
FIG. 10 is a side view of the lower bracket of FIG. 8.

FIGS. 8-10 illustrate lower bracket 200. As can be seen, lower bracket 200 includes a first arm 210 and a second arm 220. First arm 210 is the structure that defines the lower portion of slot 10A and second arm 220 is the structure that defines the lower portion of slot 10B.

Base 230 of lower bracket 200 also defines a first aperture 231 and a second aperture 232, which align with first aperture 131 and second aperture 132 of upper bracket 100, respectively. The aligned apertures of the upper bracket 100 and the lower bracket 200 can also be seen in FIG. 4. As such, the tool 600 that is used to rotate helical drive 400 is insertable through first aperture 131 of upper bracket 100 and first aperture 231 of lower bracket 200 to extend through the brackets 100, 200 and into helical drive 400. Likewise, the bolt 602 mentioned above is received through second aperture 132 of upper bracket 100 and is threaded into threaded second aperture 232 of lower bracket 200. The bolt 602 has a head that engages with base 130 of upper bracket 100 and is threaded into second aperture 232 of lower bracket 200 where it may, but is not required to, engage with the top of helical drive 400, which is disposed under lower bracket 200. By threading the bolt 602 into the lower bracket 200, a compression force may be applied to the upper and lower brackets by the bolt 602 as a result of a cantilever action caused by the bolt 602 on the upper bracket 100 such that the first slot 10A is somewhat narrowed to clamp a solar panel(s) in the first slot 10A.

Conversely, no narrowing of the second slot 10B occurs because the cantilever effect does not affect the second slot 10B because of the positioning of the bolt 602 with respect to the second slot 10B and the co-linearly extending bottom wall 140 and vertical wall 121 of arm 120 of upper bracket 100. Thus, arm 120 does not rotate downward as a result of any compression force applied by the bolt 602.

As such, the first slot 10A may be used to clamp a south solar panel in the first slot 10A and a north solar panel is merely slid into, and not clamped, in the second slot 10B, where the south solar panel is lower vertically than the north solar panel in a North-South arrangement of the solar panels on a slanted roof that slants vertically upward from south to north.

The same tool 600 that is used to rotate the helical drive 400 can also be used to thread the bolt 602 into the lower bracket 200. The tool can be inserted into a similarly configured aperture in the head of the bolt 602 to rotate the bolt 602. The tool and aperture may have an allen wrench design or Torx™ or square head design.

Lower bracket 200 includes slots 233 and 234 in base 230. Slots 233, 234 are disposed outside of apertures 231, 232 on base 230. As will be further discussed, upwardly extending arms 310, 320 of the stanchion 300 are received through slots 233, 234 such that the lower bracket 200 is vertically movable on the arms when drive 400 is rotated. Thus, the arms 310, 320 do not operatively engage with structure of the lower bracket 200, but rather, merely pass through the slots such that the lower bracket is vertically movable with respect to the arms. Thus, the arms can extend up through base 230 of the lower bracket 200; however, they do not extend up through upper bracket 100. Lower bracket 200 also includes stop bars 262 and 264, which provide a hard edge that abuts and aligns the solar panels when inserted into slots 10B and 10A, respectively. Lower bracket 200 also includes a bonding pin 604 that is electrically-connected to bracket 200 and, in an embodiment, has a sharp point for penetrating a coating/layer on the solar panel, e.g., an anodized aluminum coating/layer. Bonding pin 604 can be a press-fit cylinder made of stainless steel, and can include a cusp-like, radiused sharp point at its tip, with knurled surfaces around the outer circumferential surface of the embedded portion. The exposed head of bonding pin 604 can have a mushroom-shape in cross-section, which provides an overhanging lip that prevents pin 604 from being over-driven into the lower bracket 200 when press-fit into lower bracket 200.

The arms 310, 320 of stanchion 300 are disposed with respect to upper bracket 100 and between arms 210, 220 of lower bracket 200 such that the arms do not extend into the slots 10A, 10B that are defined by the upper and lower brackets. Likewise, the tool 600 and the bolt 602 also do not extend into slots 10A, 10B since the aligned apertures of the brackets are disposed between arms 110, 120 of upper bracket 100 and between arms 210, 220 of lower bracket 200. As such, the height of the helical drive 400 can be adjusted even after solar panels are mounted in the brackets 100, 200. The outer diameter of drive 400 extends radially beyond the arms 310 and 320.

As also mentioned above, lower bracket 200 includes a slot 235 that receives within it the lower edge 142 of the bottom wall 140 of upper bracket 100 to mount the upper bracket 100 on the lower bracket 200.

Thus, in this embodiment, the upper bracket 100 and the lower bracket 200 are separate components that are mated with one another. However, the present invention is not limited to the upper bracket and lower bracket being joinable separate components. Rather, the upper bracket and the lower bracket can be a single structure that would be one solidly-formed device, thus, a single component that includes upper arms and lower arms that form respective slots 10A, 10B.

As a further alternative embodiment, both this embodiment of the single component and the embodiment of the two joined brackets 100, 200, with both of these embodiments being broadly referred to as a "bracket", can be used to mount one or many solar panels within their respective slots. Thus, the longitudinal length of the bracket can vary and be long enough to only receive one solar panel within a slot, and thus be a "short micro-rail", or be long enough to receive at most two adjacent panels within a slot, and thus be a "micro-rail", or be long enough to receive four or more adjacent panels within a slot of a longer extending bracket, and thus be a "rail". Of course, for longer extending brackets, there may be two or more helical drives, and the other associated components of the assembly, provided along the length of the rail.

As can be particularly be seen in FIG. 10, lower bracket 200 also includes on an underside of the bracket, and between lower arms 241 and 242, a first L-shaped retainer 236 and a second L-shaped retainer 237. As will also be described further, a top plate 402 of helical drive 400 is received within retainers 236, 237 and is retained within retainers 236 and 237 such that helical drive 400 is coupled to the lower bracket 200 and can rotate with respect to lower bracket 200 (since the top plate 402 is able to rotate within the retainers). Lower arms 241 and 242 each include an aperture and may be used to secure other structure to lower bracket 200, such as a micro-inverter, for example.

Figure 11:
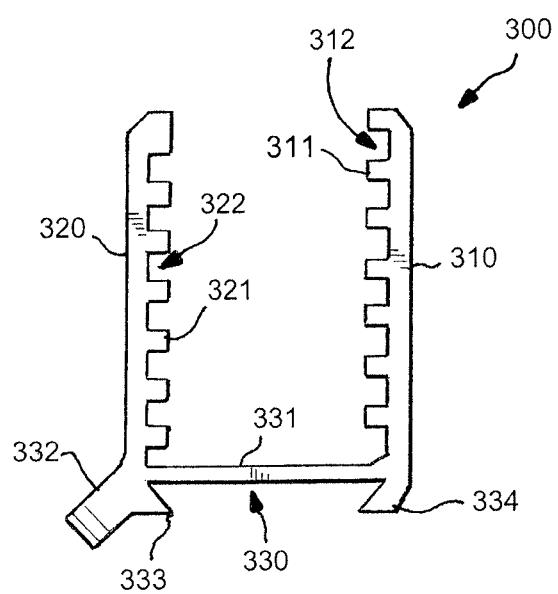
FIG. 11 is side view of a first embodiment of a stanchion of the embodiment of FIGS. 1-5.
Figure 12:
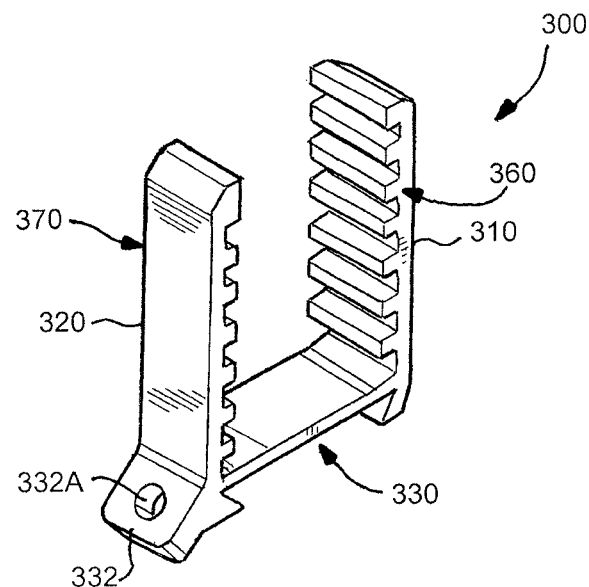
FIG. 12 is a perspective view of the stanchion of FIG. 11.

The assembly 10 of the first embodiment also includes the stanchion 300 as discussed above and which can be seen in FIGS. 11 and 12. Stanchion 300 includes arms 310, 320, as also discussed above, which define, and are disposed in-between, parallel planes 360 and 370. Arms 310, 320 extend vertically from a base 330 and are interconnected by a wall 331 of the base. Arm 310 includes inwardly-facing teeth 311 which define grooves 312. Likewise, arm 320 includes inwardly-facing teeth 321 which define grooves 322. As can be understood, the grooves and teeth of helical drive 400 respectively engage with the teeth and grooves of the arms of the stanchion such that the helical drive is able to move vertically up and down on the arms through rotation of the helical drive relative to the stanchion. Stanchion 300 can be made of an aluminum alloy that is extruded. The teeth 321 that define grooves 322 can be straight, as shown in FIGS. 11 and 12, or they can be cylindrically-shaped (i.e., curved) to match the inner and outer diameters of helical drive 400, respectively. If the teeth are curved, then stanchion 300 would need to be machined, rather than extruded. If stanchion 300 is machined, then drive 400 and stanchion 300 could optionally include fine threads, i.e., a thread pitch greater than 12 threads/inch, instead of using coarse square threads, as illustrated at least in FIGS. 11 and 12.

Base 330 of stanchion 300 includes a first leg 332 with a first engagement portion 333 and a second leg 334 that forms a second engagement portion. Engagement portions 333 and 334 engage with respective engagement portions on base 500 to mount the stanchion 300 on the base 500. An aperture 332A is defined by first leg 332, through which a securement device, e.g., a bolt, is received to secure the stanchion 300 to the base 500. The securement device engages on the base 500.

Figure 13:
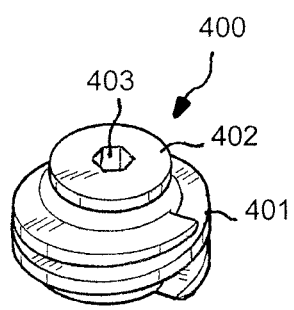
FIG. 13 is a perspective view of a first embodiment of a helical drive of the embodiment of FIGS. 1-5.
Figure 14:
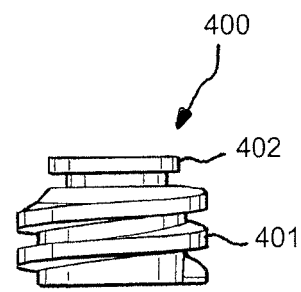
FIG. 14 is a side view of the helical drive of FIG. 13.

FIGS. 13 and 14 further illustrate the helical drive 400. As can be seen, helical drive 400 includes a helix structure 401 with square grooves and teeth that engage with the square teeth and grooves on the arms of the stanchion 300. As can also be seen, the helical thread extends from a bottom of the helical drive to a top of the helical drive. Helical drive 400 also includes a top plate 402, discussed previously, which is received within the retainers 236, 237 of lower bracket 200. An aperture 403 is defined by, and within, top plate 402 which receives within it tool 600 for rotating, and thus vertically moving, the helical drive 400 on the arms of the stanchion 300. Optionally, aperture 403 can extend vertically completely through drive 400 from top to bottom. The tool 600 and aperture 403 may also have an allen wrench design, as discussed above. However, of course, a tool is not required to rotate the helical drive 400. It could also be rotated by hand. FIG. 2 also illustrates the helical drive 400 with respect to the other components of the assembly and the tool 600 in a cut-away view.

Whereas this embodiment of the helical drive 400 includes a top plate 402 for coupling drive 400 with the lower bracket 200, it is not required that the helical drive is mechanically coupled to the lower bracket. As discussed above, all that is required is that the lower bracket be supported on the helical drive such that the lower bracket moves as a result of the helical drive moving.

Further, it is not required that the drive of the present invention be a helical drive. Any of a variety of drive devices, with different drive mechanisms, can be used with the principles of the present invention. For example, a ratchet drive could be utilized where a ratchet and pawl mechanism could provide for vertical movement of the drive on the arms of the stanchion.

Figure 15:
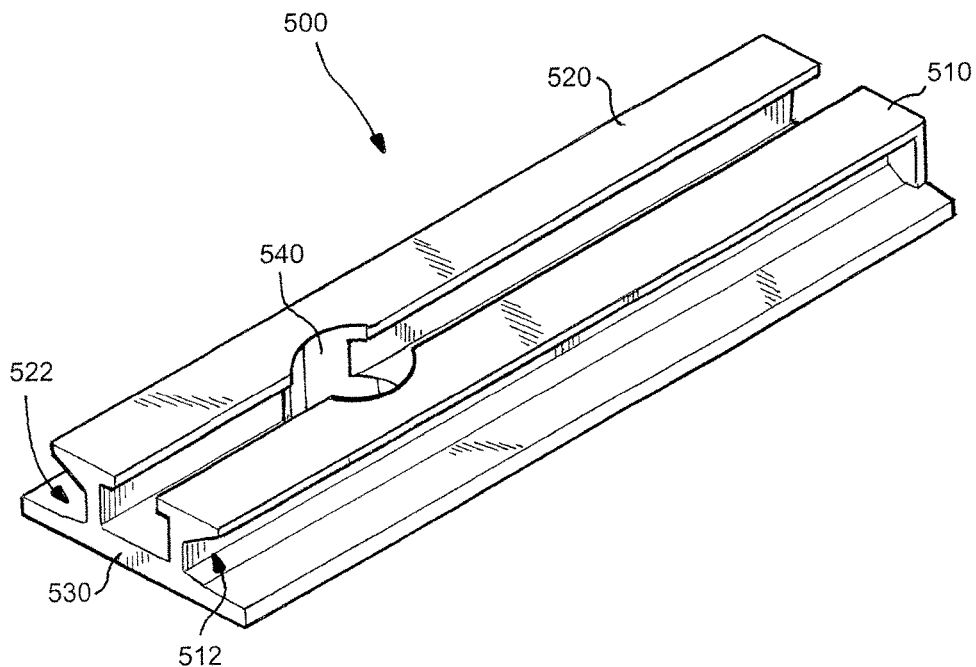
FIG. 15 is a perspective view of a first embodiment of a base of the embodiment of FIGS. 1-5.
Figure 16:
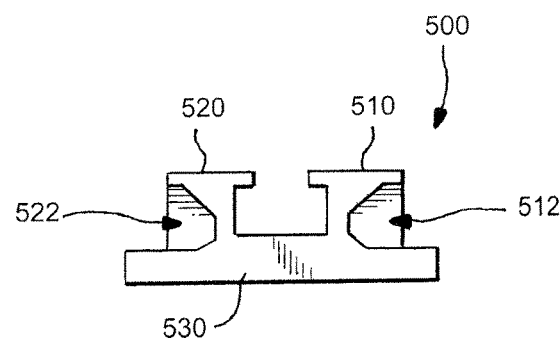
FIG. 16 is a front view of the base of FIG. 15.

FIGS. 15 and 16 further illustrate the base 500. As can be seen, base 500 includes first ledge 510, second ledge 520, and a bottom plate 530. A first slot 512 is defined between first ledge 510 and bottom plate 530 and a second slot 522 is defined between second ledge 520 and bottom plate 530.

Referring back to FIGS. 11 and 12, the first engagement portion 333 of first leg 332 of stanchion 300 and the second engagement portion 334 of stanchion 300 engage in first slot 512 and second slot 522 of base 500, respectively, to mount the stanchion 300 on the base 500. The securement device is threaded through aperture 332A in first leg 332 to engage with base 500 to variably positionably secure the stanchion 300 at a position on the base 500.

As can be understood, the legs of the stanchion 300 can be variably slid within the slots 512, 522 of the base 500 such that the stanchion can be positioned at various locations along the length of the base to accommodate for the particular circumstances on any specific mounting installation. Thus, the stanchion 300 is variably positionable on, and securable to, the base 500.

The bottom plate 530 is mounted on the surface of a roof or building on which the solar panels are to be mounted. As such, bottom plate 530 defines an aperture 540 through which mounting hardware, such as a bolt or lag screw, may be extended to engage in a surface to secure the base 500 to the surface, typically with flashing.

Thus, as can be understood, with the present invention, continuous height adjustment and structural support may be provided by the height adjustable solar panel mounting assembly. Continuous height adjustment is provided by the engagement of the helical drive with the teeth and grooves that extend all along the height of the arms of the stanchion, in the presently described embodiment. The present invention also provides for height adjustability even after the solar panels are installed in the bracket, i.e., post-installation.

Further, the helical drive 400 does not need to be fastened or fixed in place to stay at a desired height, i.e., it is free to move and "rattle" about within assembly 10. Additionally, the height adjustment is not limited to only predefined discrete positions of height adjustment, i.e., it is continuously adjustable.

With the present invention, the height adjustment device, comprising the stanchion and the helical drive in an embodiment, is an integral part of the mounting assembly itself, and thus, is inherent to the mounting assembly. As such, the height adjustment device also provides structural support of the solar panels and a load path to the roof.

Figure 17:
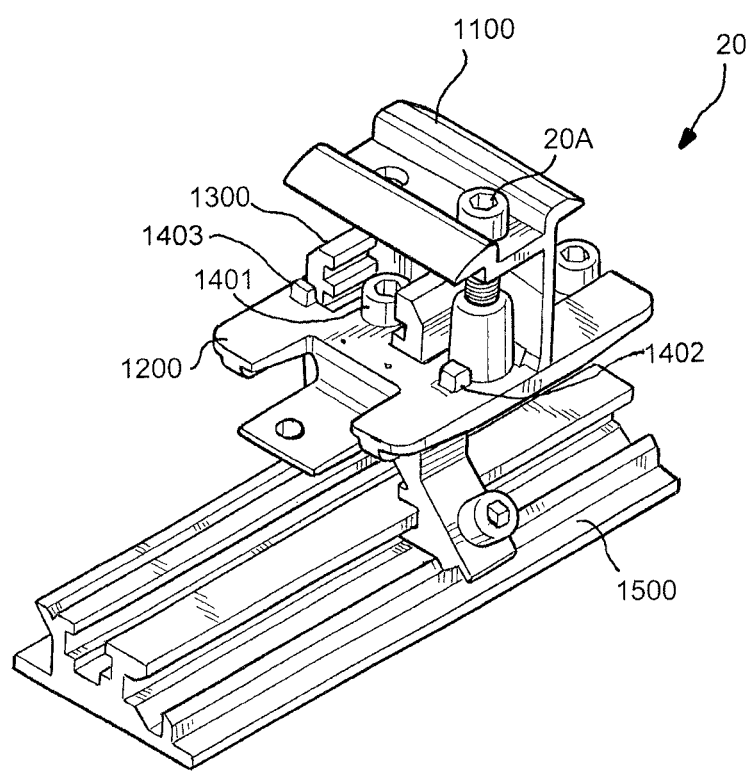
FIG. 17 is a perspective view of a second embodiment of a height adjustable solar panel mounting assembly in accordance with the principles of the present invention.
Figure 18:
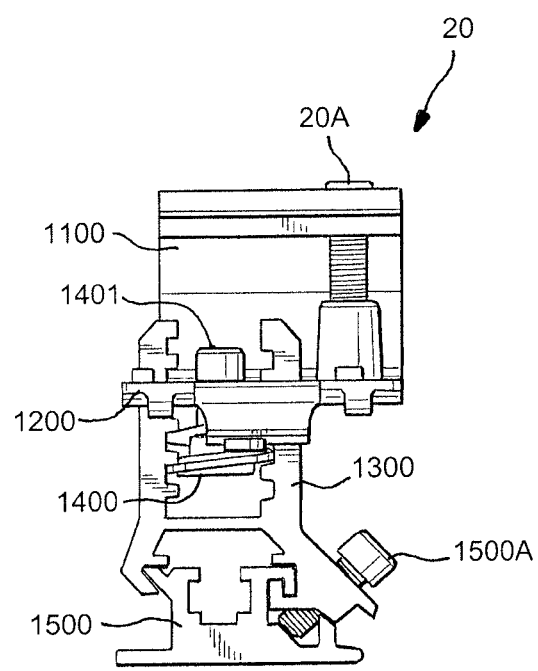
FIG. 18 is a side view of the assembly of FIG. 17.

FIGS. 17 and 18 illustrate a second embodiment of a height adjustable solar panel mounting assembly 20 in accordance with the principles of the present invention.

As can be seen, the assembly 20 also includes an upper bracket 1100, a lower bracket 1200 (which together form a mounting bracket for mounting solar panels), a stanchion 1300, a helical drive 1400, and a base 1500.

Since the assembly 20 of the second embodiment has the same functionality as the assembly 10 of the first embodiment, and generally the same structural components, only differences in the structures of the two embodiments will be discussed below.

Figure 19:
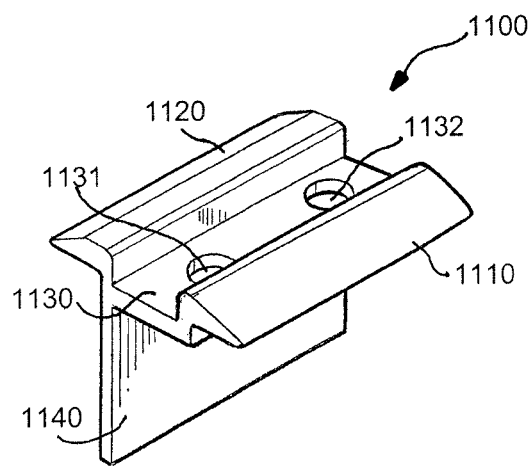
FIG. 19 is a perspective view of a second embodiment of an upper bracket of the embodiment of FIGS. 17 and 18.
Figure 20:
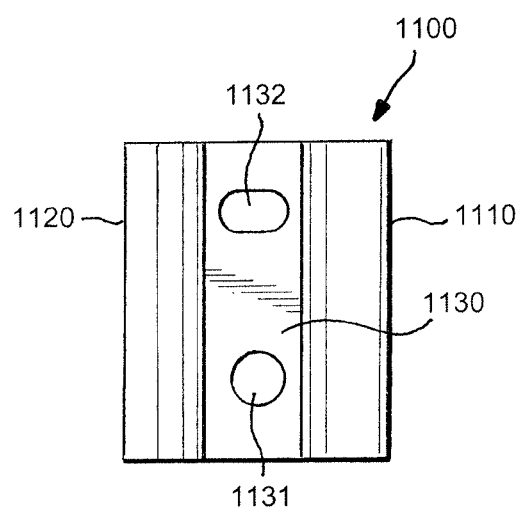
FIG. 20 is a top view of the upper bracket of FIG. 19.

FIGS. 19 and 20 illustrate a second embodiment of an upper bracket 1100. Upper bracket 1100 includes a first arm 1110, a second arm 1120, a base 1130, and a bottom wall 1140. Different from the first embodiment, the first aperture 1131 and second aperture 1132 in base 1130 are spaced differently. The tool 600 that is used to rotate helical drive 1400 is insertable through first aperture 1131 and second aperture 1132 receives a bolt 20A through it, similar to bolt 602, as discussed previously. The spacing provides more separation between the apertures such that a tower can be provided on the lower bracket 1200 to align with second aperture 1132.

Figure 21:
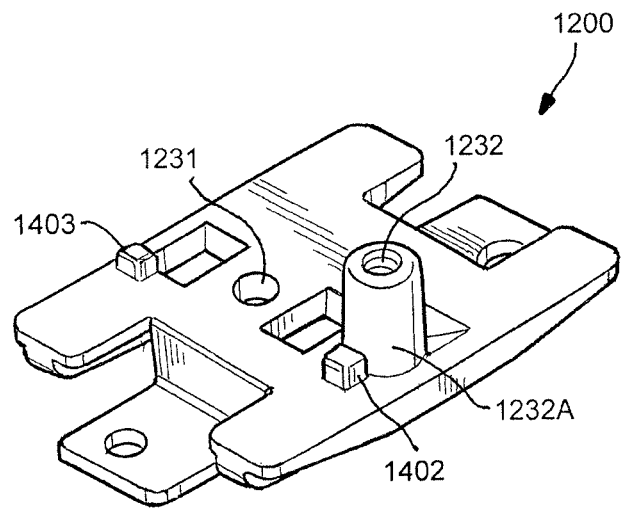
FIG. 21 is a perspective view of a second embodiment of a lower bracket of the embodiment of FIGS. 17 and 18.
Figure 22:
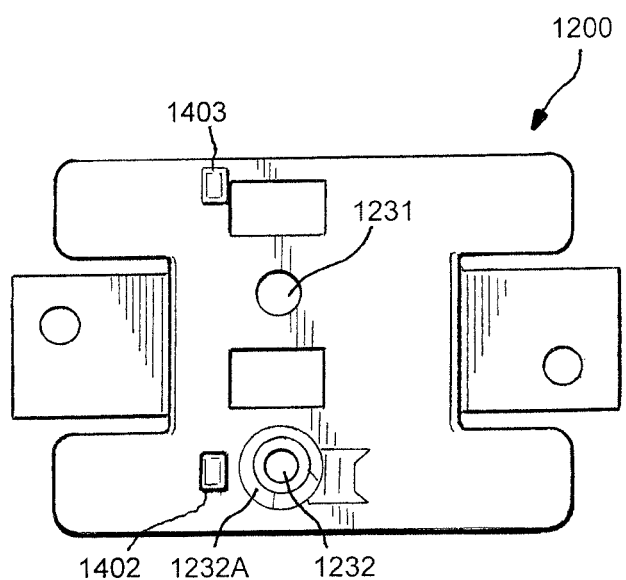
FIG. 22 is a top view of the lower bracket of FIG. 21.

FIGS. 21 and 22 illustrate the second embodiment of lower bracket 1200. As can be seen, first aperture 1231 and second aperture 1232 are spaced correspondingly to the apertures in the upper bracket 1100. Additionally, second aperture 1232 also has an optional tower 1232A associated with it. The tower 1232A can also be threaded such that the bolt 20A that extends though the aligned apertures, and the tower 1232A, is also threaded into the tower. Thus, an almost complete vertical structure extends between the upper and lower brackets to receive the bolt 20A, as can be further particularly seen in FIGS. 17 and 18. Lower bracket 1200 is castable and can be made, for example, of a cast aluminum or steel alloy. Lower bracket 1200 includes vertical stop posts 1402 and 1403, which abut and align a solar panel(s) when inserted into the assembly.

Figure 23:
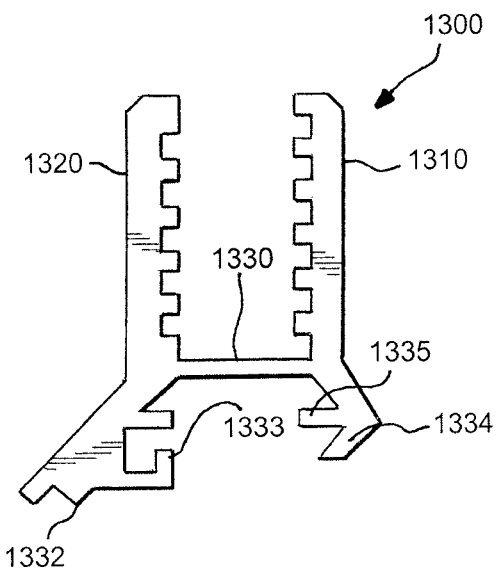
FIG. 23 is a side view of a second embodiment of a stanchion of the embodiment of FIGS. 17 and 18.

FIG. 23 illustrates the second embodiment of a stanchion 1300. Stanchion 1300 also includes arms 1310, 1320, and a base 1330. Base 1330 also includes a first engagement portion, however, the first engagement portion differs from the first embodiment. The first engagement portion includes a lower extension 1332 and an upper extending leg 1333. The second engagement portion includes a leg 1334 and a ridge 1335. The engagement portions will be further described below in conjunction with the base of the second embodiment.

Figure 24:
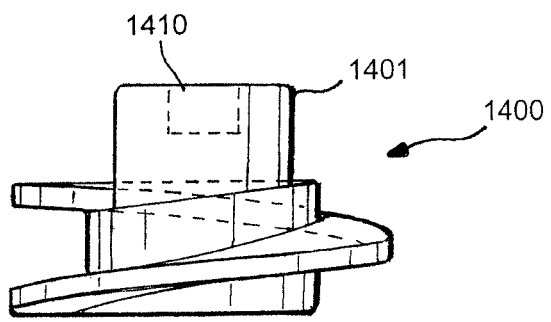
FIG. 24 is a side view of a second embodiment of a helical drive of the embodiment of FIGS. 17 and 18.

FIG. 24 illustrates the helical drive 1400 of the second embodiment. Rather than including a top plate as in the first embodiment, the helical drive 1400 has an upper extending portion 1401 that defines an aperture 1410 for engaging the tool 600. Optionally, aperture 1410 can extend vertically completely through drive 1400, from top to bottom. The upper extending portion 1401 extends up through aperture 1231 of lower bracket 1200, as can be seen in FIGS. 17 and 18. Also, since the helical drive 1400 does not have a top plate, the lower bracket 1200 also does not have corresponding retainers on the bottom thereof as in the first embodiment. As such, the helical drive 1400 is coupled to the lower bracket 1200 by the upper extending portion 1401 in this embodiment.

Figure 25:
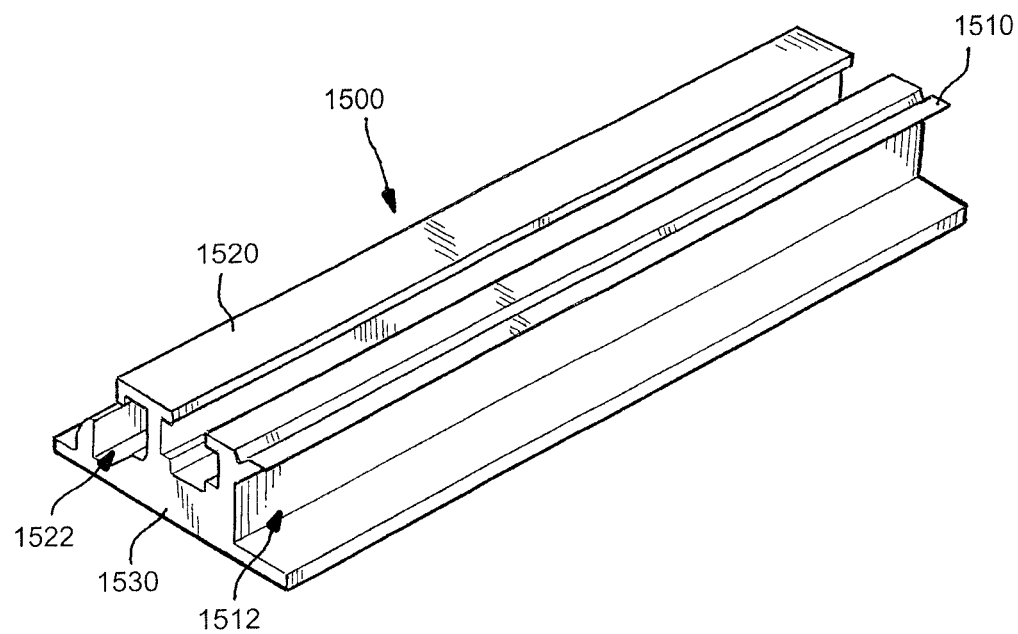
FIG. 25 is a perspective view of a second embodiment of a base of the embodiment of FIGS. 17 and 18.
Figure 26:
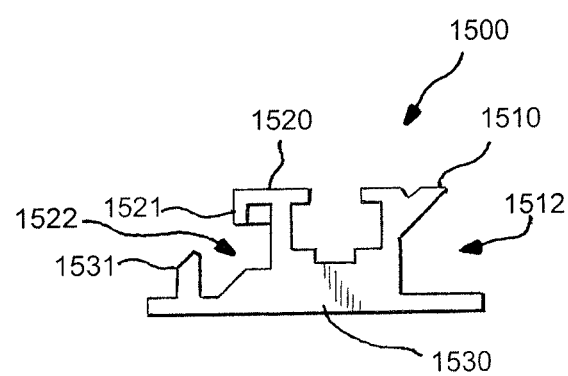
FIG. 26 is a front view of the base of FIG. 25.

FIGS. 25 and 26 further illustrate the base 1500 of the second embodiment. As can be seen, base 1500 also includes first ledge 1510, second ledge 1520, and a bottom plate 1530. A first slot 1512 is defined between first ledge 1510 and bottom plate 1530 and a second slot 1522 is defined between second ledge 1520 and bottom plate 1530.

As can be seen in FIGS. 18 and 26, the lower extension 1332 of the first engagement portion of stanchion 1300 engages with an upper extending portion 1531 of bottom plate 1530. The upper extending leg 1333 of stanchion 1300 engages with a correspondingly configured lower extending leg 1521 of second ledge 1520 of base 1500. The leg 1334 and ridge 1335 of the second engagement portion of stanchion 1300 engages with first ledge 1510 of base 1500. A securement device 1500A, e.g., a bolt, is threaded through an aperture in the first engagement portion of stanchion 1300 to engage with base 1500 to variably positionably secure the stanchion 1300 at a position along the length of base 1500.

In other embodiments, the vertical drive mechanism can be a ratchet and pawl mechanism, a rack and pinion mechanism, a worm-drive mechanism, or a fine-thread screw with corresponding fine-threads on the stanchion's arms.

The length of base member 500 (see FIG. 1) can be selected to be sufficiently short so that no cutting of shingles is required when installing on a composition roof with shingles. The base, for example, can be 6.75 inches long.

Figure 27:
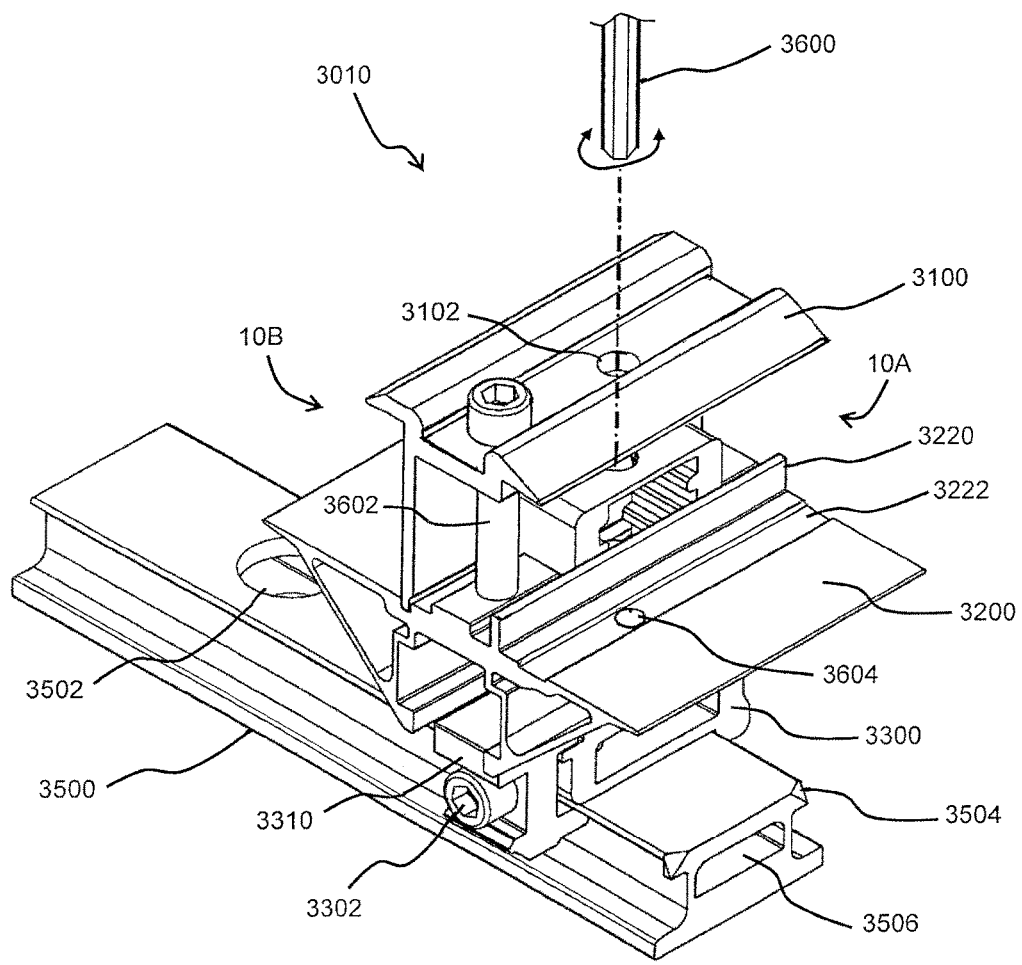
FIGS. 27-29 are perspective views of a third embodiment of a height adjustable solar panel mounting assembly in accordance with the principles of the present invention.
Figure 28:
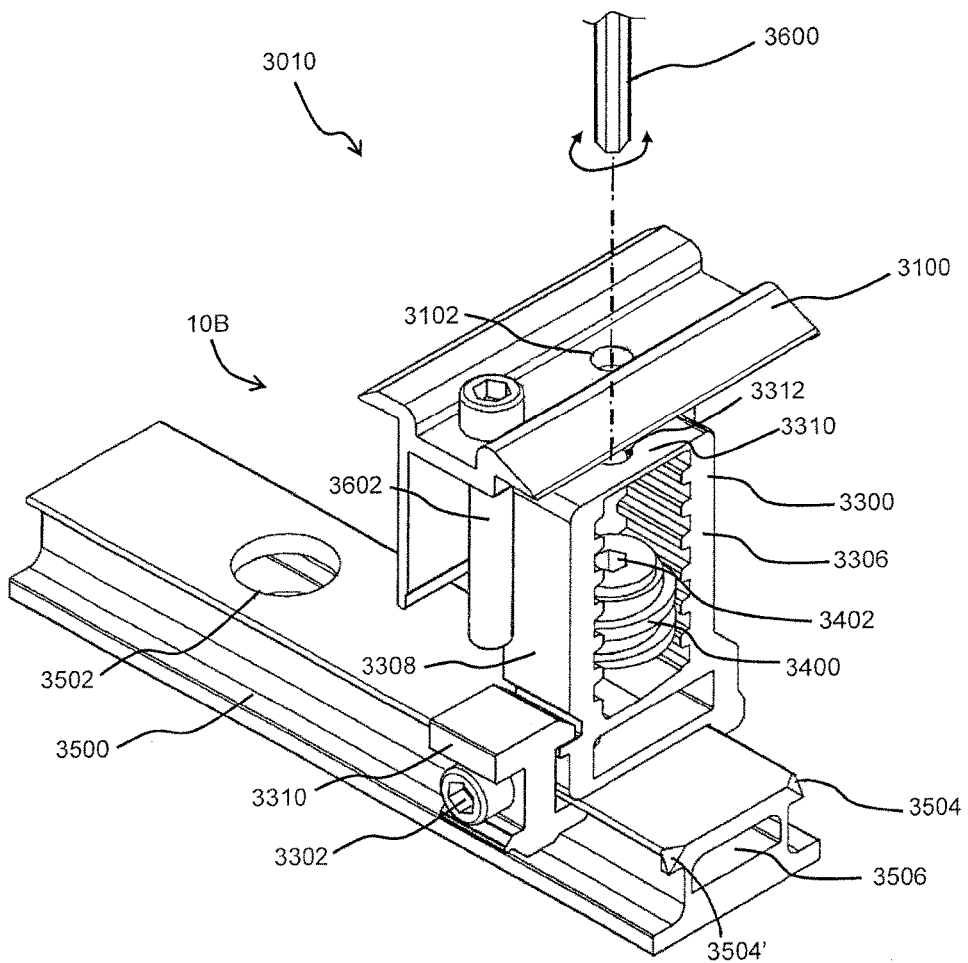
Figure 29:
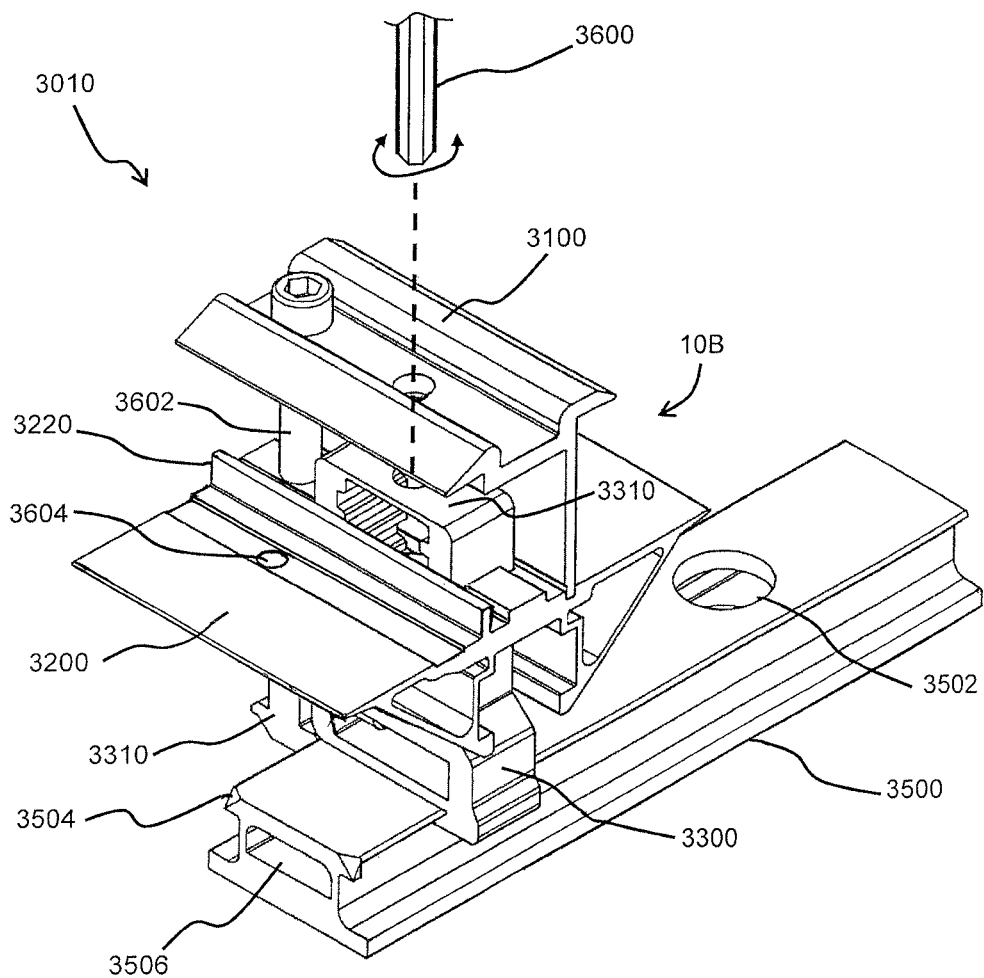

FIGS. 27-29 are perspective views of a third embodiment of a height adjustable solar panel mounting assembly 3010 in accordance with the principles of the present invention. As can be seen, the assembly 3010 also includes an upper bracket 3100, a lower bracket 3200 (which again together form a mounting bracket for mounting solar panels), a stanchion 3300, a helical drive 3400, and a base 3500.

Since the assembly 3010 of the third embodiment has the same functionality as the assembly 10 of the first embodiment, and generally the second embodiment, and also generally the same structural components, only differences in the structures of the two embodiments will be discussed below. First clamping bolt 3602 clamps the upper bracket 3100 down to lower bracket 3200 when one or more solar panels are installed in slot 10A. Second clamping bolt 3302 provides a clamping force to secure an "I"-shaped side clamp 3310 and the bottom portion of stanchion 3300 together when clamping stanchion 3300 onto base 3500. Stop bar 3220 runs sideways across the width of lower bracket 3200 and serves as a stop to abut against, and align, the solar panel(s) when installed in slot 10A. Stop bar 3220 also prevents the solar panel(s) from touching the upper portion of stanchion 3300. Bonding pin 3604 is disposed in a hole 3235 located in recessed channel 3222 in lower bracket 3200. Bonding pin 3604, as discussed previously, serves to pierce the anodized aluminum coating on the solar panel and electrically interconnect (ground) the solar panel to the lower bracket 3200 of assembly 3010.

In FIG. 28, the lower bracket 3200 has been removed from the view to more clearly illustrate helical drive 3400 disposed within stanchion 3300. Stanchion 3300 includes two vertical arms: first arm 3306 and second arm 3308. Disposed across the tops of arms 3306 and 3308 is an integral bridge segment 3310 which connects across the two tops. Second aperture 3312, located below a clamping wing of upper bracket 3100 and having a centerline that is co-linear with first aperture 3102, is disposed within bridge segment 3310 and provides vertical access for tool 3600, e.g., an allen wrench, to engage with a patterned, e.g., hexagonal, aperture 3402 of helical drive 3400.

The central portion of base 3500 defines a central, hollow channel 3506 that runs down the longitudinal axis of the base. The two end corners 3504, 3504' at the same end of base 3500 have been peened down approximately 0.1-0.2 inches. These deformed corners form a hard stop that prevents stanchion 3300 from sliding off of base 3500 when bolt 3302 is not completely tightened and when base 3500 is tipped down in one direction. Also, FIGS. 27-29 illustrate a base 3500 with a single mounting hole 3502 for fixing the base to a roof. Alternatively, a pair of mounting holes can be used (not illustrated), which gives the installer the option of choosing one hole over the other when installing a lag screw to fix the base to the roof, thereby relieving the need to flip the assembly over in a North/South direction when orienting the assembly 3010 on the roof prior to installation.

Figure 30:
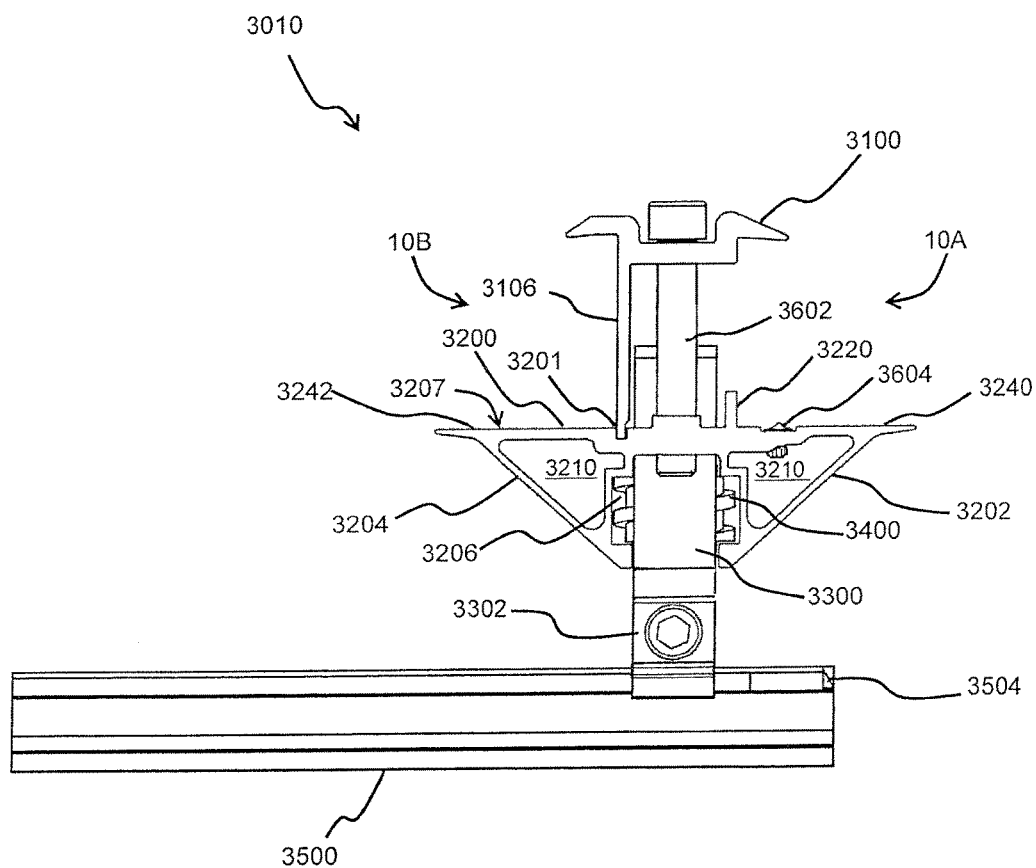
FIG. 30 is a side view of the third embodiment of a height adjustable solar panel mounting assembly of FIGS. 27-29.

FIG. 30 is a side view of the third embodiment of the height adjustable solar panel mounting assembly 3010. Upper bracket 3100 includes a vertical wall 3106 that has a lower end that engages with a slot 3201 that is disposed within, and across the width of, lower bracket 3200. Lower bracket 3200 includes an integral pair of symmetric stiffening ribs 3202, 3204 disposed underneath the mounting plane 3207 of lower bracket 3200 which serve to stiffen the distal extents, i.e., wings 3240 and 3242, of lower bracket 3200. Hollow space 3210 is disposed (on both sides) in-between stiffening ribs 3202, 3204 and the horizontal plane (mounting plane 3207) of lower bracket 3200. Disposed in-between the two stiffening ribs 3202, 3204 is an integral, rectangular "box" 3206 that mechanically surrounds, engages, and supports, i.e., couples, helical drive 3400 to lower bracket 3200. The upper and lower interior horizontal ledges of box 3206 rest on, i.e., couple to, the upper and lower horizontal surfaces of drive 3400, respectively. Support box 3206 transfers vertical motion of helical drive 3400 to vertical motion of lower bracket 3200.

In contrast to the embodiment of FIG. 30, in embodiments of the present invention, as discussed previously, the upper bracket 3100 and the lower bracket 3200 can be manufactured as a single, monolithic, integral part. This can be manufactured as a single extrusion, for example.

Figure 31:
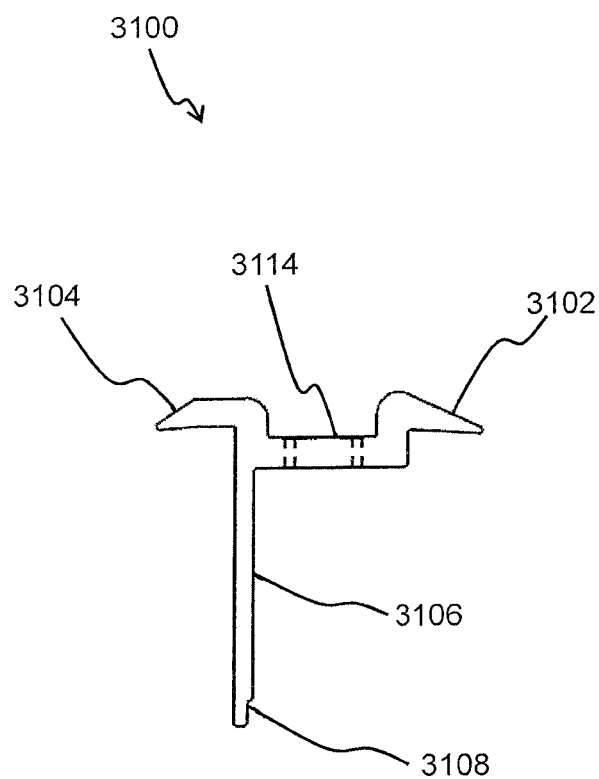
FIG. 31 is a side view of a third embodiment of an upper bracket.
Figure 32:
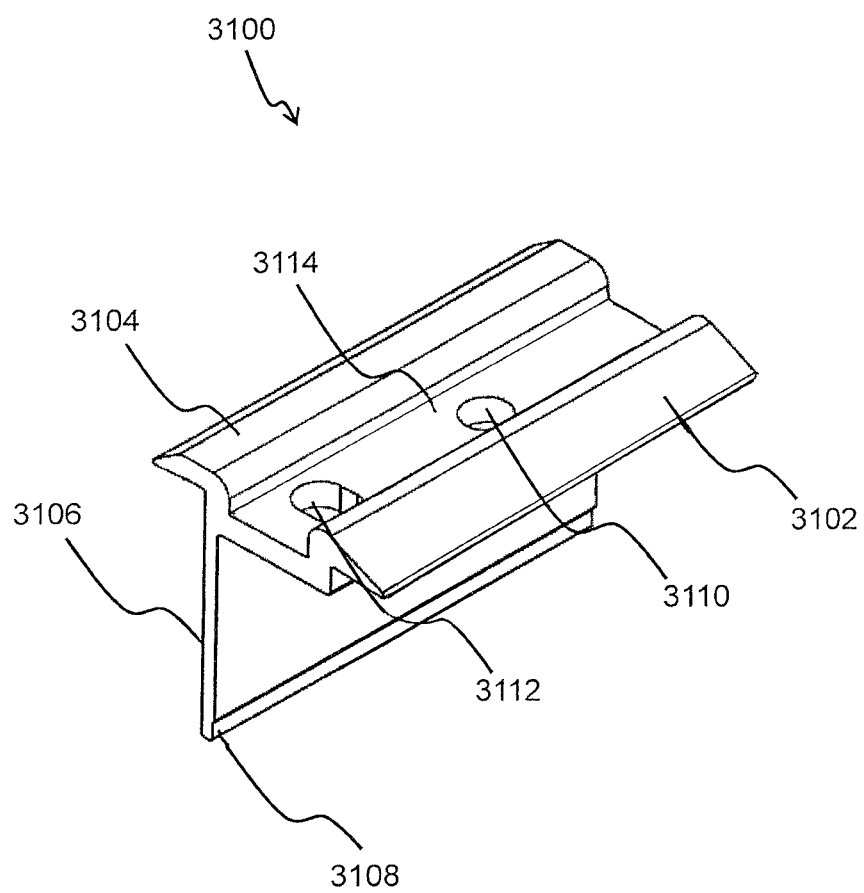
FIG. 32 is a perspective view of the third embodiment of an upper bracket.

FIG. 31 is a side view of the third embodiment of the upper bracket 3100 and FIG. 32 is a perspective view of the third embodiment of the upper bracket. Upper bracket 3100 includes a bottom vertical wall 3106 that is integrally joined to a horizontal base 3114, which is integrally joined to a pair of tapered wings (ledges) 3102 and 3104 that extend outwardly and horizontally from base 3114. Tapered wings 3102 and 3104 serve to clamp the solar panels down to lower bracket 3200 in slots 10A and 10B, respectively, as discussed previously.

Figure 33:
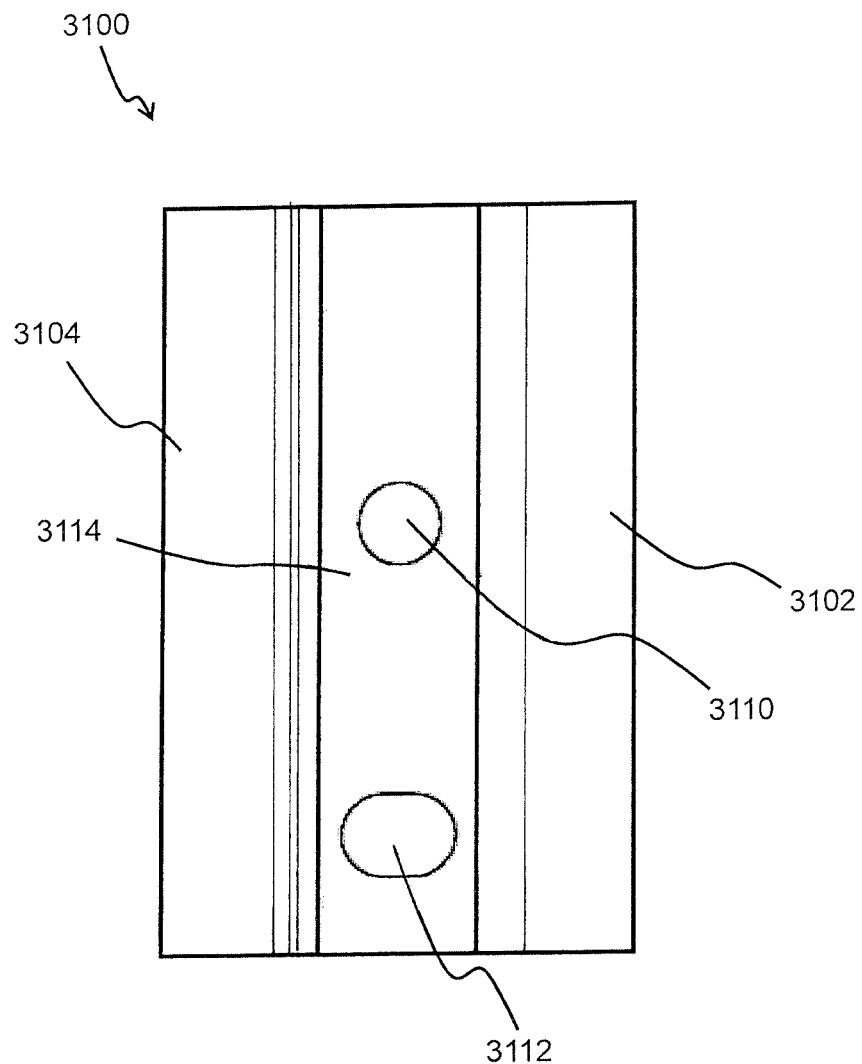
FIG. 33 is a top view of the third embodiment of the upper bracket.

FIG. 33 is a top view of the third embodiment of the upper bracket. Upper bracket 3100 similarly includes a pair of apertures 3110 and 3112 disposed through the base 3114.

Figure 34:
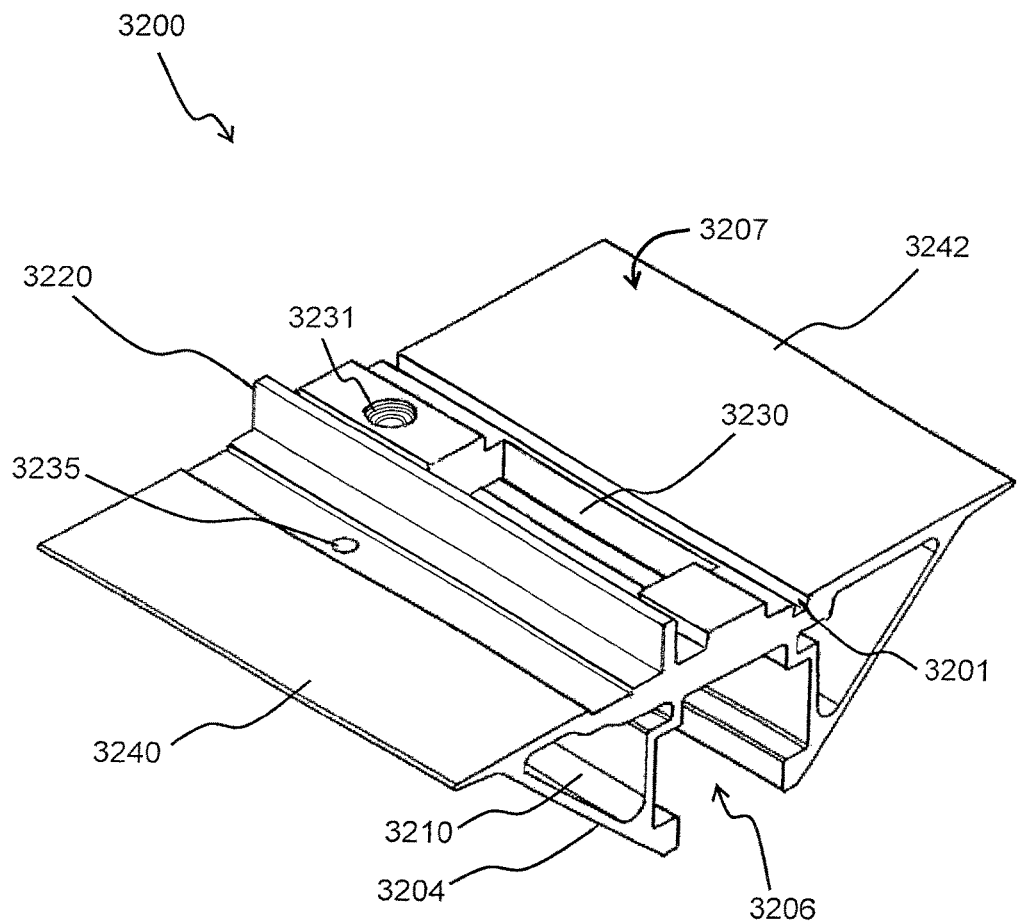
FIG. 34 is a perspective view of a third embodiment of a lower bracket.

FIG. 34 is a perspective view of the third embodiment of the lower bracket. As discussed, lower bracket 3200 includes a pair of horizontal ledges (arms) 3240 and 3242 which define a horizontal mounting plane 3207. A central, rectangular aperture 3230 is disposed through the center of bracket 3200 and serves to receive the upper arms of stanchion 3300. Threaded hole 3231 is disposed on the side of bracket 3200 for receiving clamping bolt 3602 that connects upper bracket 3100 to lower bracket 3200. Aperture 3235 is included in lower bracket 3200 for receiving a bonding pin that is press-fit into aperture 3235. Slot 3201 is disposed in bracket 3200 for receiving the tapered lower end 3108 of vertical wall 3106 of upper bracket 3100. As also discussed, vertical stop bar 3220 runs sideways across the width of lower bracket 3200 and serves to abut and align the edge of a solar panel(s) that is inserted into slot 10A.

Figure 35:
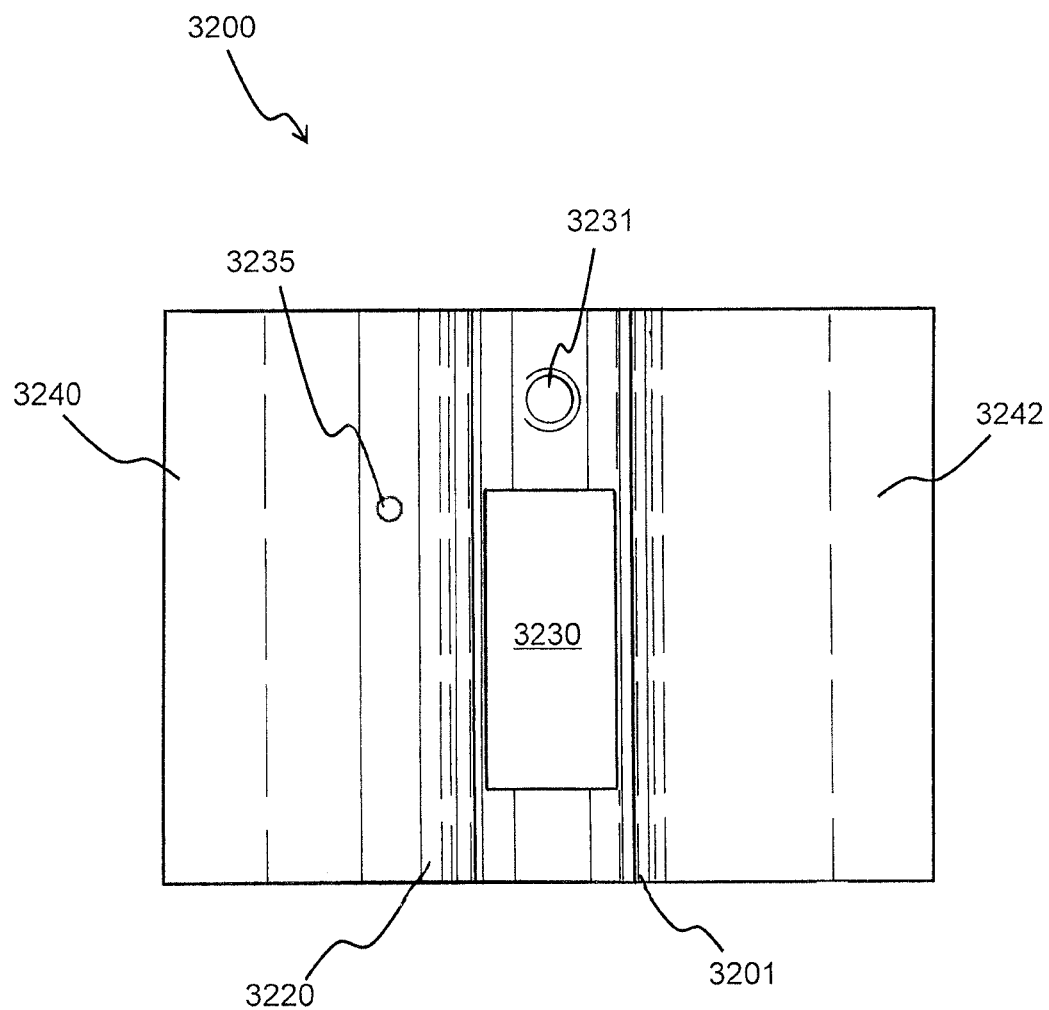
FIG. 35 is a top view of the third embodiment of the lower bracket.

FIG. 35 is a top view of the third embodiment of the lower bracket. This third embodiment differs from the first embodiment shown in FIG. 9 in that slots 233 and 234 in FIG. 9 have been replaced with a single, rectangular aperture 3230 as shown in FIG. 35.

Figure 36:
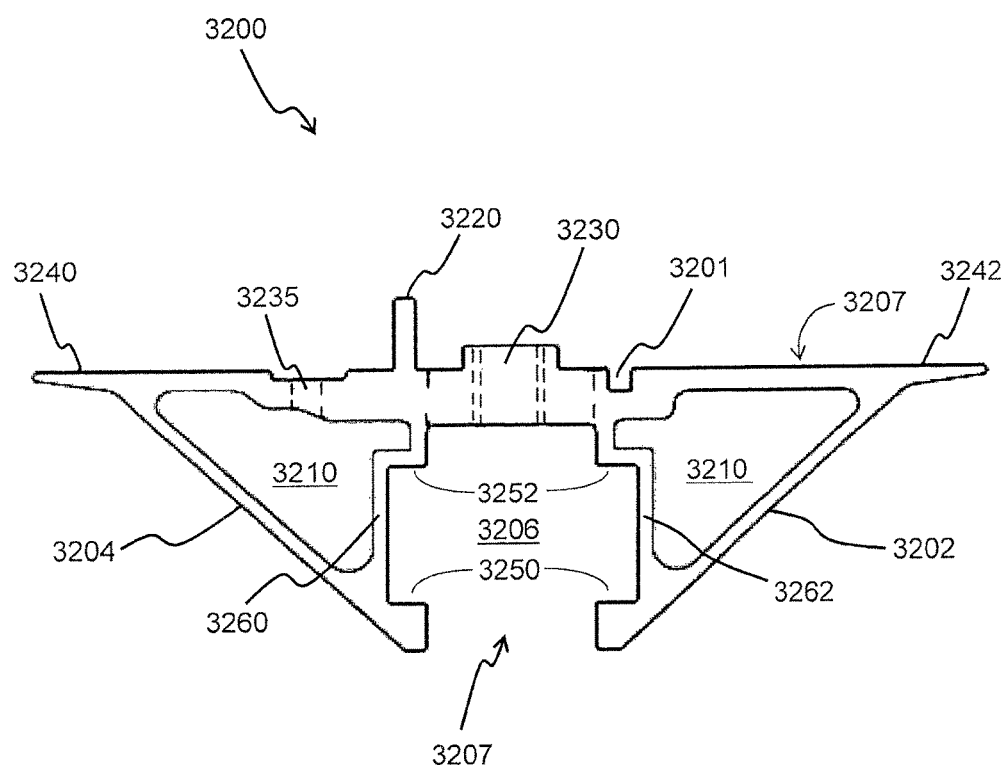
FIG. 36 is a side view of the third embodiment of the lower bracket.

FIG. 36 is a side view of the third embodiment of the lower bracket 3200. As discussed, a pair of symmetric, integral stiffening webs 3202, 3204 are disposed underneath horizontal ledges (arms) 3242, 3240, respectively. Webs 3202, 3204 are integrally connected to vertical wall segments 3262, 3260, respectively. Vertical wall segments 3260, 3262 define a rectangular "box" 3206 which has a pair of horizontal ledges: lower ledge 3250 and upper ledge 3252. Helical drive 3400 (not shown in FIG. 36) is disposed inside box 3206 and engages with lower bracket 3200 through box 3206 such that box 3206 serves as a coupler which couples the helical drive to the lower bracket. In particular, the upper surface 3410 of drive 3400 (see FIGS. 39 and 40) adjoins and engages with upper ledge 3252 of box 3206 and the lower surface 3412 of drive 3400 adjoins and engages with lower ledge 3250 of box 3206. In this manner, vertical movement of helical drive 3400 is transferred to vertical movement of lower bracket 3200 when drive 3400 is operated, i.e., rotated by tool 3600. As can be seen in FIG. 36, the lower end 3207 of box 3206 is open to allow the arms of stanchion 3300 to pass therethrough.

Figure 37:
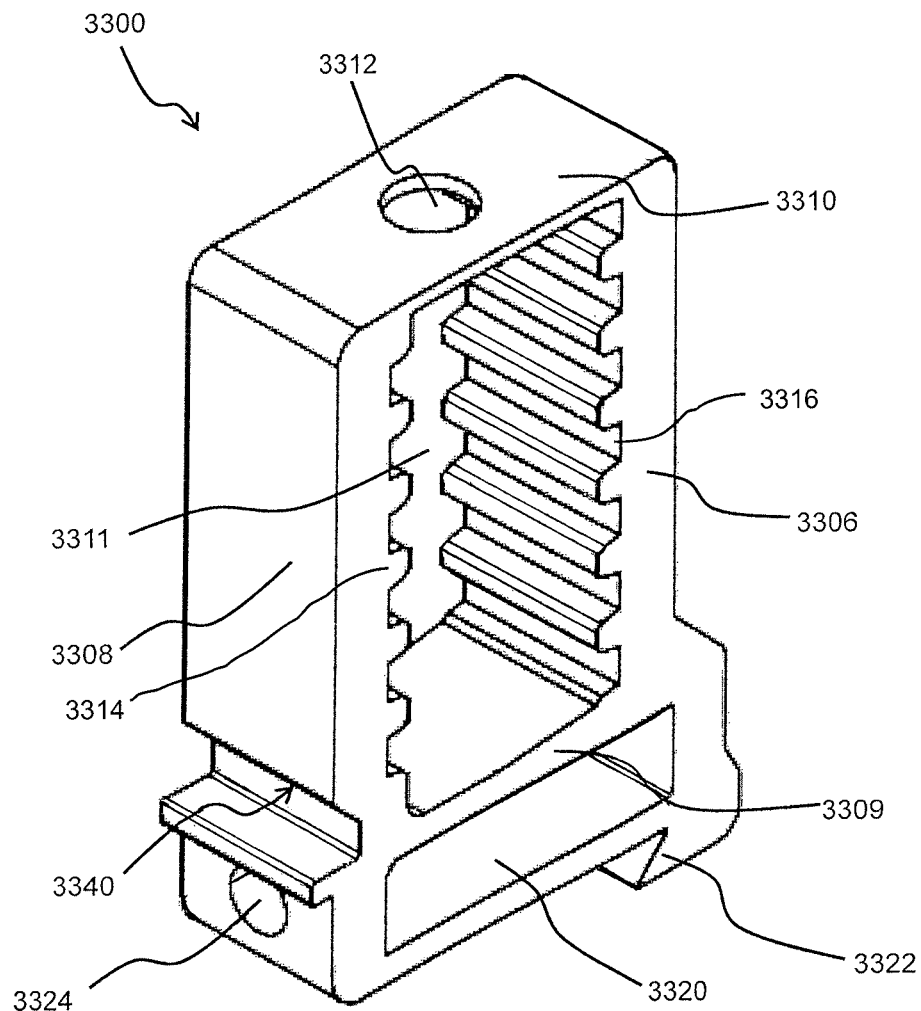
FIG. 37 is a perspective view of a third embodiment of a stanchion.
Figure 38:
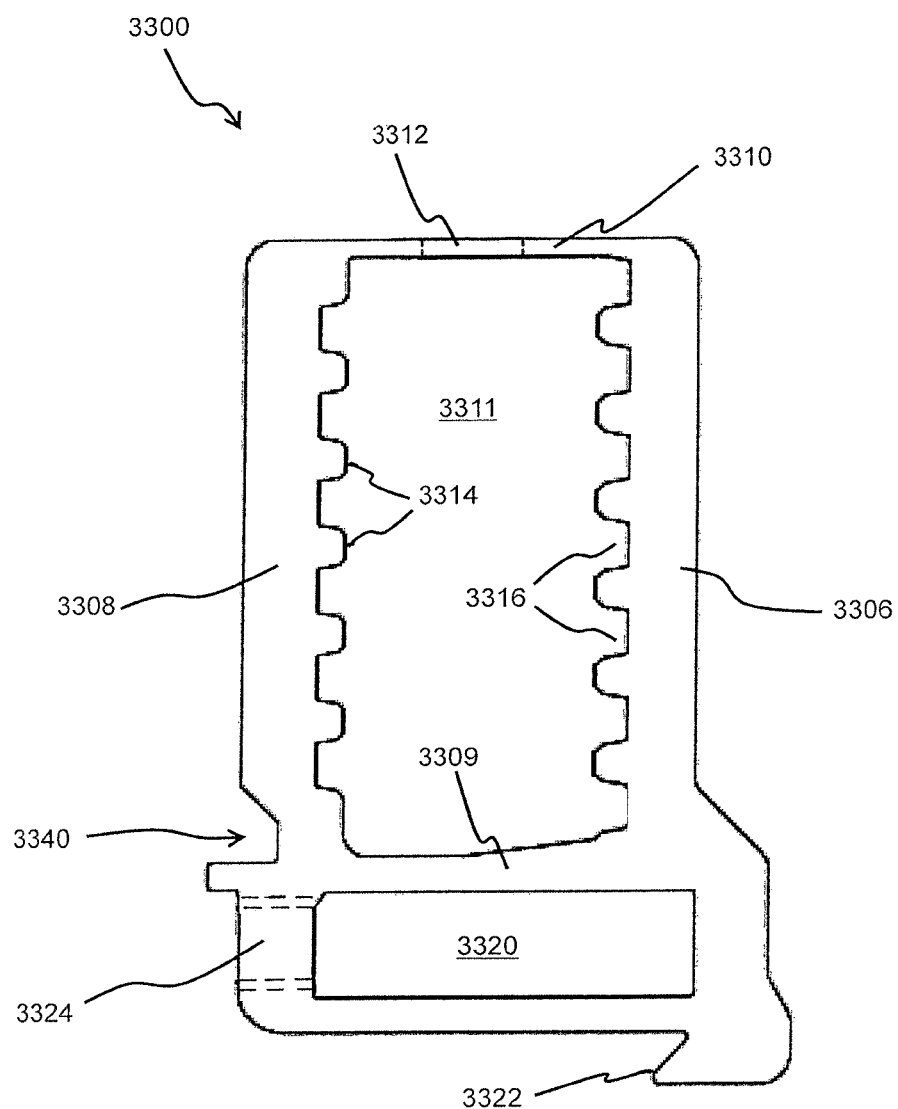
FIG. 38 is a side view of the third embodiment of the stanchion.

FIGS. 37 and 38 are perspective and side views, respectively, of the third embodiment of a stanchion. Stanchion 3300 includes a pair of vertical arms 3306 and 3308 defining a first open volume 3311 disposed in-between the two arms. Arms 3306 and 3308 are integrally joined at their bottom extent by base 3309 and they are integrally joined at their top extent by top 3310. Aperture 3312 is defined by top segment 3310. The central first volume 3311 of the stanchion is hollow. Stanchion 3300 includes a plurality of square teeth 3314 and a vertically offset set of mating grooves 3316, with a tooth pitch that matches the pitch of helical drive 3400. A second hollow volume 3320 is disposed at the bottom of stanchion 3300. Hook foot 3322 is disposed at the bottom of stanchion 3300 and is used to assist in clamping stanchion 3300 to base 3500 using a fastener, e.g., a bolt, disposed through threaded hole 3324 in the bottom of stanchion 3300 on a side opposite that from hook foot 3322. Short groove 3340 is disposed along the horizontal length of stanchion 3300 and serves to engage with "I"-shaped side clamp 3310.

Figure 39:
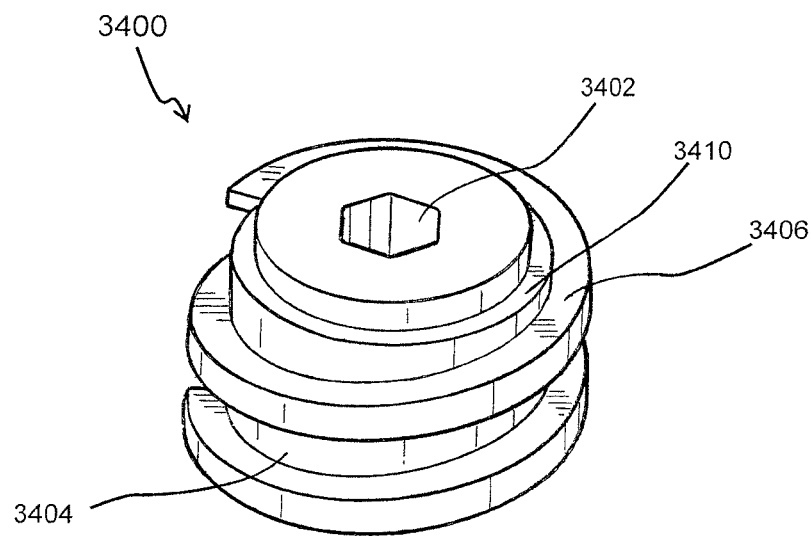
FIG. 39 is a perspective view of a third embodiment of a helical drive.
Figure 40:
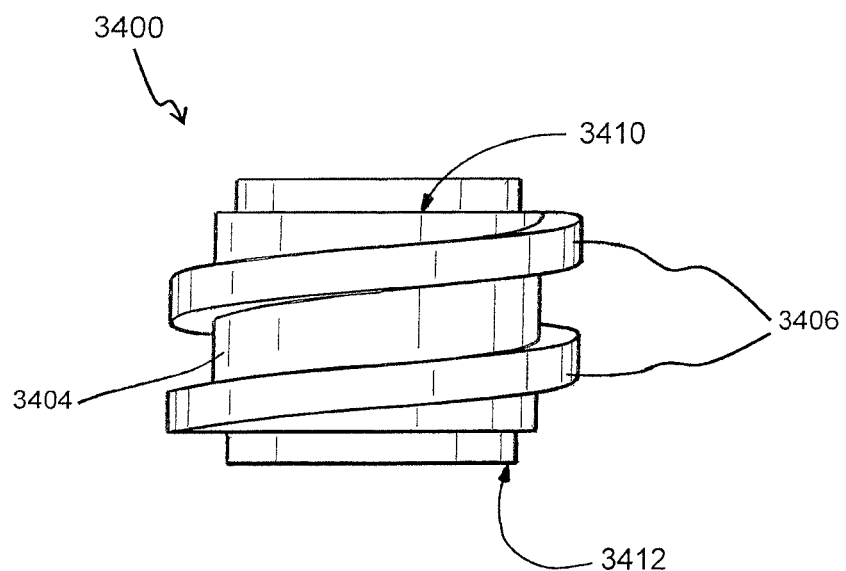
FIG. 40 is a side view of the third embodiment of the helical drive.

FIG. 39 is a perspective view of the third embodiment of a helical drive and FIG. 40 is a side view of the third embodiment of the helical drive.

Helical drive 3400 includes a helical thread 3406 that winds helically around the outer diameter 3404 of drive 3400. Aperture 3402 is disposed in the top of drive 3400 and can run through the entire longitudinal length of drive 3400.

Aperture 3402 can be an allen wrench pattern, e.g., hexagon, or it can be a Torx™ style drive pattern or a square drive pattern.

Figure 41:
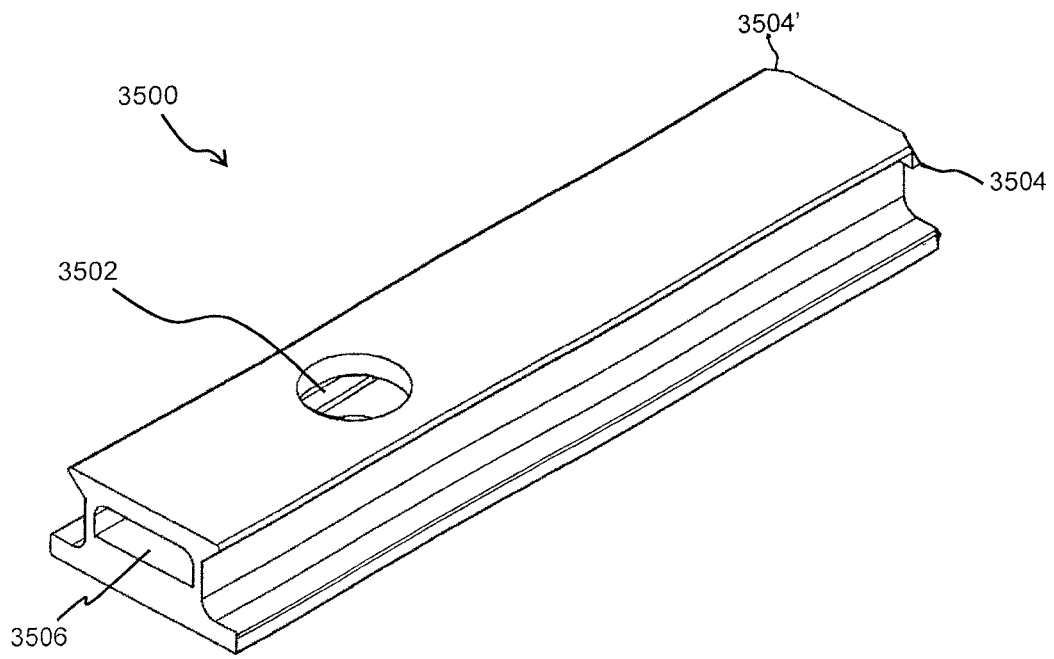
FIG. 41 is a perspective view of a third embodiment of a base.

FIG. 41 is a perspective view of a third embodiment of a base. As discussed, base 3500 includes a hollow volume 3506 that extends along the longitudinal length of base 3500. One end of base 3500 has corners 3504, 3504' that are peened down to prevent stanchion 3300 from slipping off that peened end. Base 3500 further includes an aperture 3502 for receiving a fastener, such as a lag screw or lag bolt.

Figure 42:
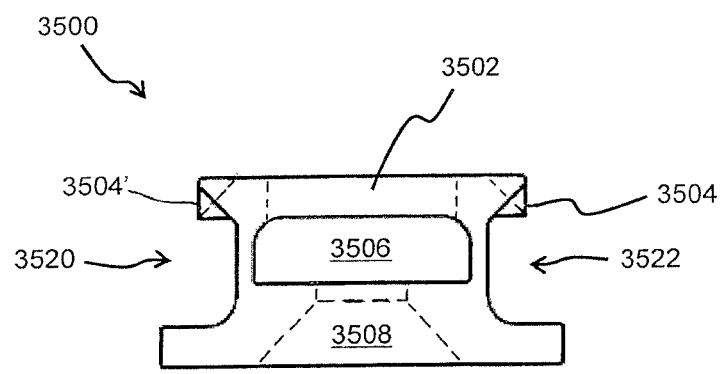
FIG. 42 is an end view of the third embodiment of the base.
Figure 43A:
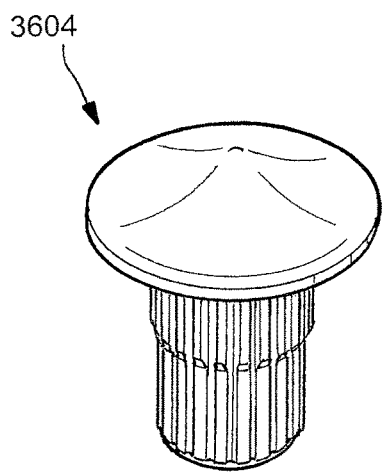
FIGS. 43A-C illustrate a first embodiment of a bonding pin in accordance with the principles of the present invention.
Figure 43B:
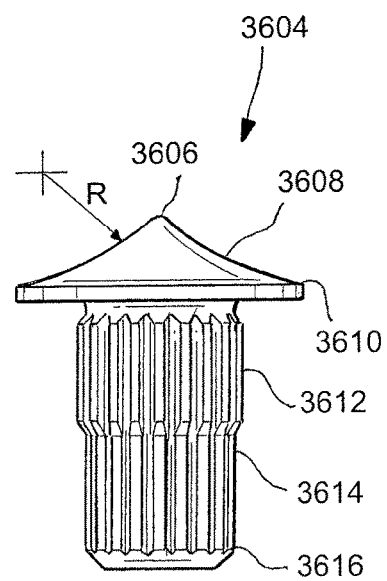
Figure 43C:
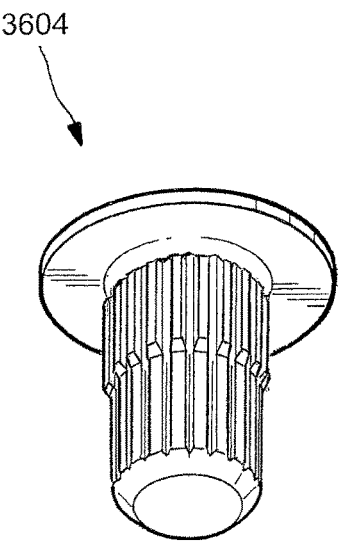

FIG. 42 is an end view of the third embodiment of a base. Base 3500 includes a frusto-conically shaped recess 3508 which receives a frusto-conically shaped elastomeric water seal element (not shown). Base 3500 includes a pair of grooves, i.e., tracks, 3520, 3522 that run along the sides of base 3500 and longitudinally down the length of the base. Grooves 3520, 3522 engage with stanchion 3300 for holding the stanchion.

Figure 44:
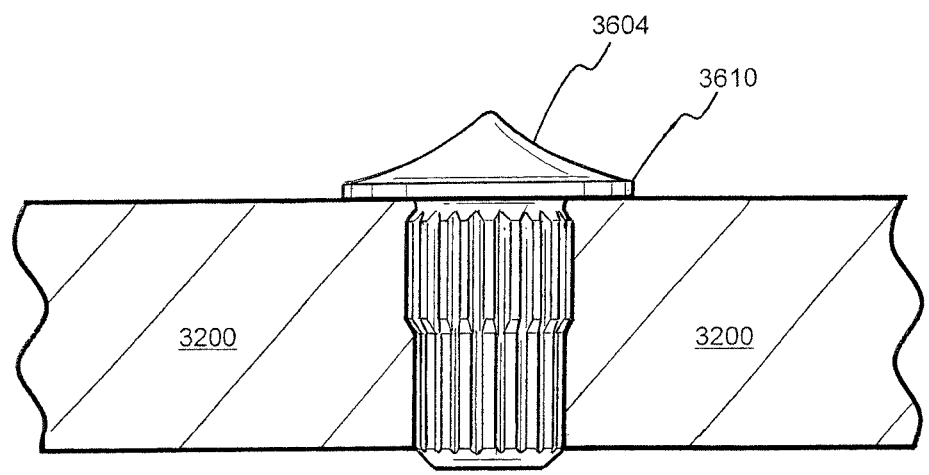
FIG. 44 is a partial cross-section view of the first embodiment of the bonding pin disposed in a lower bracket.
Figure 45A:
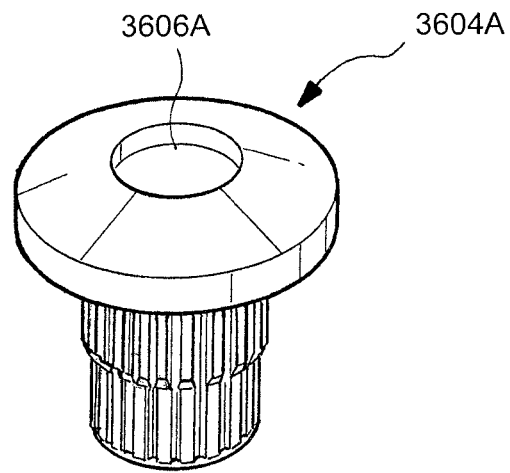
FIGS. 45A and 45B illustrate a second embodiment of a bonding pin in accordance with the principles of the present invention.
Figure 45B:
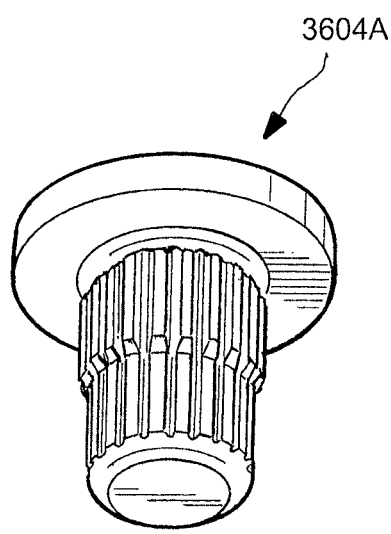

FIGS. 43A-C and 44 illustrate an embodiment of a bonding pin in accordance with the principles of the present invention. Pin 3604 has a sharp point 3606 for penetrating a coating/layer on the solar panel, e.g., an anodized aluminum coating/layer or a layer of paint. Bonding pin 3604 can be a press-fit cylinder made of stainless steel and can include a cusp-like, sharp point 3606 at its tip, a radiused side-wall section 3608 with radius=R, and knurled surfaces 3612, 3614 around an outer circumferential surface of the pin that is embedded in the lower bracket. Thus, the head of bonding pin 3604 can have a mushroom-shape in cross-section with an overhanging lip 3610 which provides an overhanging lip 3610 that prevents pin 3604 from being over-driven into the lower bracket 3200 when press-fit into bracket 3200, as shown in FIG. 44.

Figure 46:
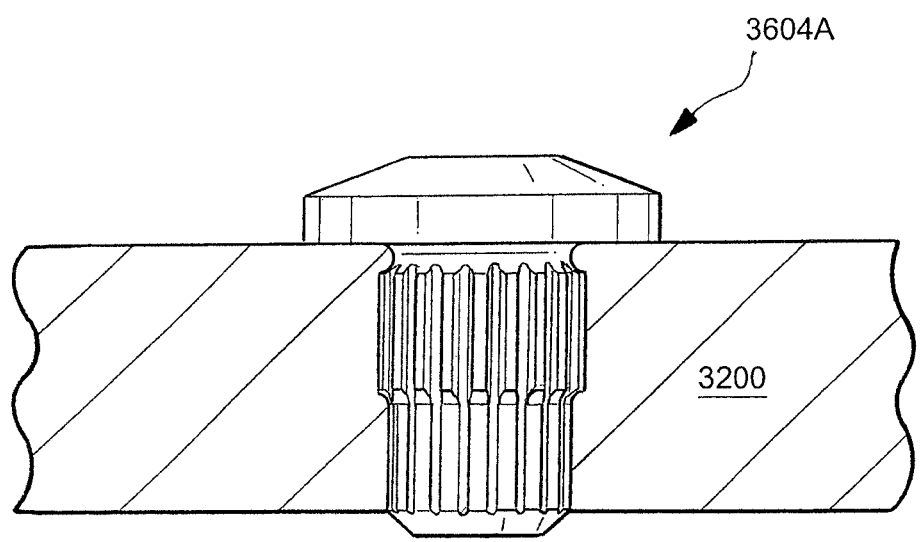
FIG. 46 is a partial cross-section view of the second embodiment of the bonding pin disposed in a lower bracket.

Additional embodiments of a bonding pin are shown in FIGS. 45 to 56. As can be seen in the embodiment of FIGS. 45A-B and 46, for the bonding pin 3604A, the sharp point has been eliminated from the embodiment of FIGS. 43A-C and 44. The sharp point is eliminated to solve a possible problem that may result from the sharp point of material erosion of the aluminum substrate, into which the bonding pin makes contact with, during a high current, e.g., 5000 A, a short pulse, e.g., 3 ms, and a moderate voltage, e.g., 240, UL test. The sharp point could concentrate too much energy into a small area (the tip) that could overheat and vaporize the substrate during the test. Thus, the embodiment of FIGS. 45A-B and 46 has a drilled hole 3606A of a diameter in the top of the pin 3604A which serves to spread out the energy flux lines (heat flux and electric field density) over a larger surface area. Through this design, any potential erosion problem can be mitigated, if not eliminated. Thus, this design optimization of a more blunt tip provides unexpected results.

Figure 47A:
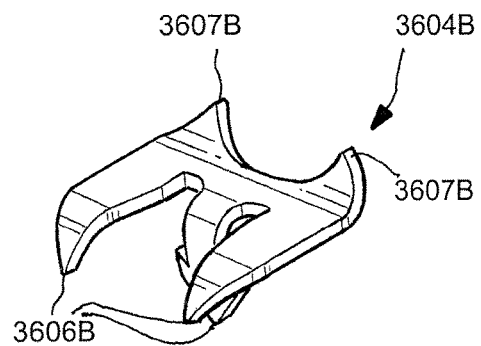
FIGS. 47A-C illustrate a third embodiment of a bonding pin in accordance with the principles of the present invention.
Figure 47B:
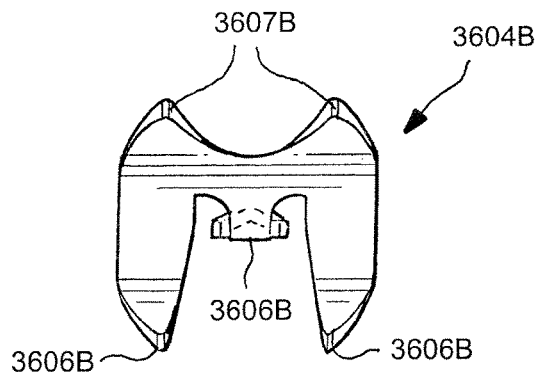
Figure 47C:
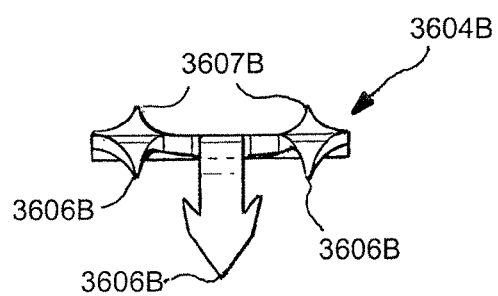

FIGS. 47A-C illustrate a further embodiment of a bonding pin in accordance with the principles of the present invention. As can be seen, bonding pin 3604B includes downward extending sharp portions 3606B and upward extending sharp portions 3607B. Downward extending sharp portions 3606B can be disposed in and/or through a lower bracket and the upward extending sharp portions 3607B can engage in a solar panel.

Figure 48A:
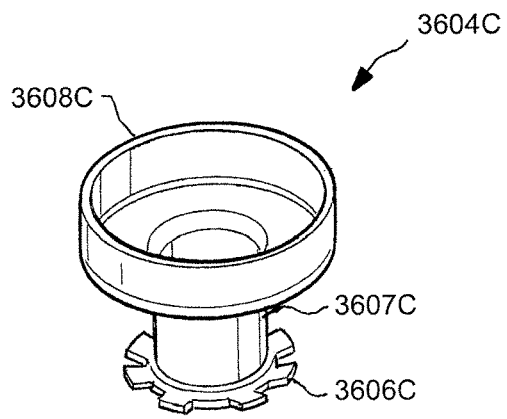
FIGS. 48A-C illustrate a fourth embodiment of a bonding pin in accordance with the principles of the present invention.
Figure 48B:
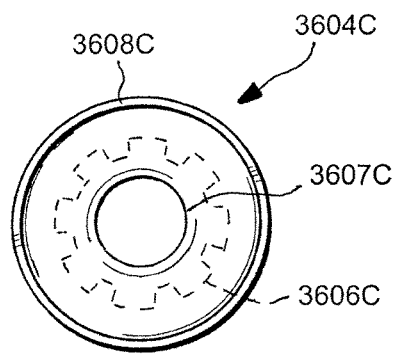
Figure 48C:
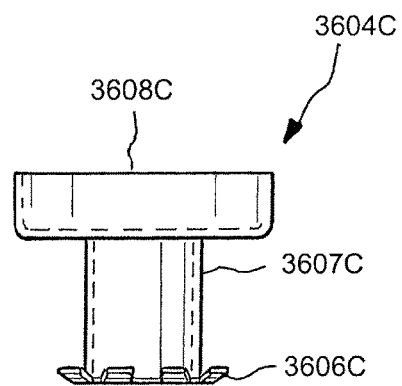

FIGS. 48A-C illustrate a further embodiment of a bonding pin in accordance with the principles of the present invention. As can be seen, bonding pin 3604C includes a portion 3606C with upward extending tabs that can engage with a lower bracket, a cylindrical portion 3607C that extends through an aperture in the lower bracket, and a round, hollow portion 3608C that can engage with a solar panel.

Figure 49A:
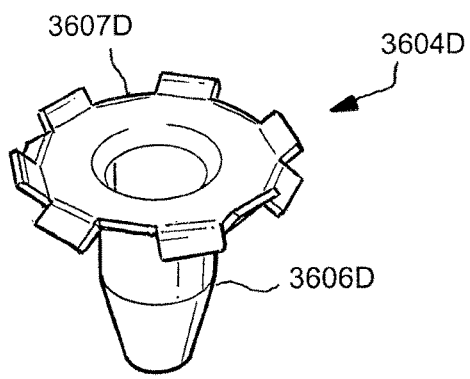
FIGS. 49A-C illustrate a fifth embodiment of a bonding pin in accordance with the principles of the present invention.
Figure 49B:
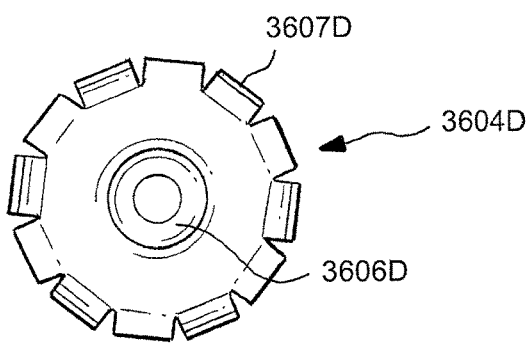
Figure 49C:
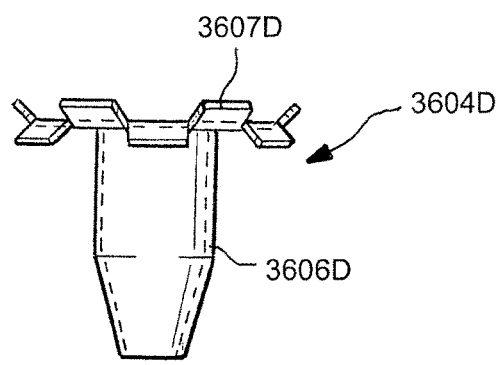

FIGS. 49A-C illustrate a further embodiment of a bonding pin in accordance with the principles of the present invention. As can be seen, bonding pin 3604D includes a lower portion 3606D, with a cylindrical upper portion and a tapered lower portion, that extends through an aperture in the lower bracket and an upper portion 3607D with upper extending and lower extending tabs that respectively engage with a solar panel and a lower bracket.

Figure 50A:
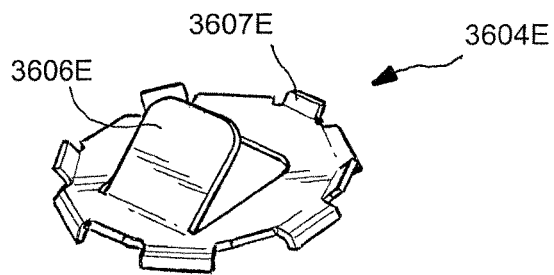
FIGS. 50A-C illustrate a sixth embodiment of a bonding pin in accordance with the principles of the present invention.
Figure 50B:
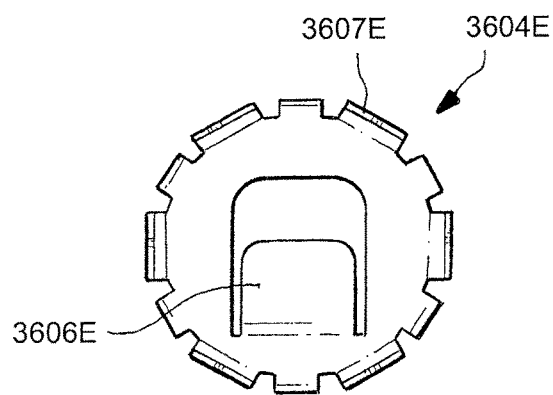
Figure 50C:
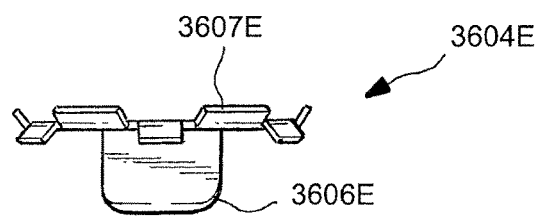

FIGS. 50A-C illustrate a further embodiment of a bonding pin in accordance with the principles of the present invention. As can be seen, bonding pin 3604E includes a portion 3606E that can engage with the lower bracket and a portion 3607E with upper extending and lower extending tabs that engage with a solar panel and a lower bracket.

Figure 51A:
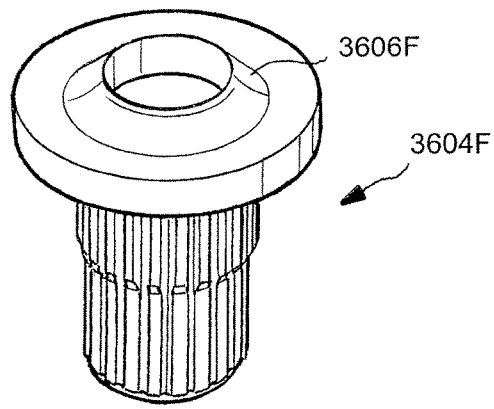
FIGS. 51A-C illustrate a seventh embodiment of a bonding pin in accordance with the principles of the present invention.
Figure 51B:
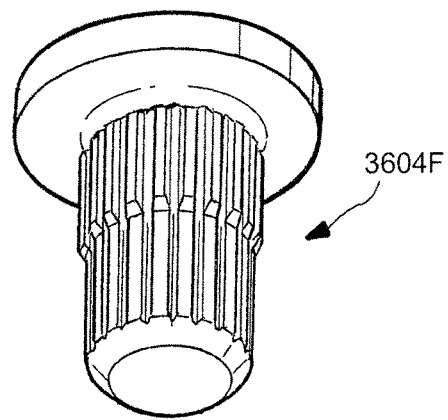
Figure 51C:
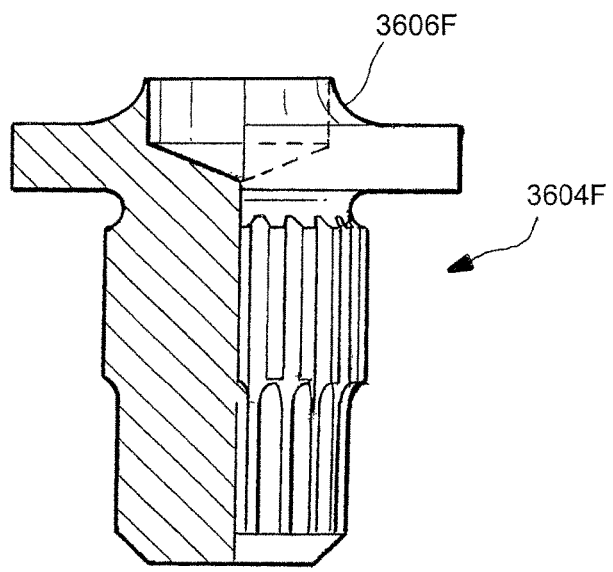

FIGS. 51A-C illustrate a further embodiment of a bonding pin in accordance with the principles of the present invention. As can be seen, bonding pin 3604F is similar to the embodiment of FIGS. 45A-B and 46. As can be seen, a radiused portion 3606F is included from the drilled hole to the overhanging lip portion.

Figure 52A:
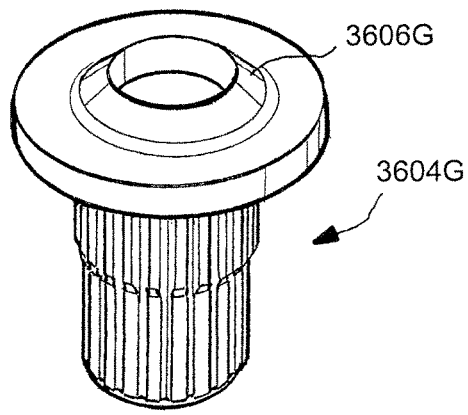
FIGS. 52A-C illustrate a eighth embodiment of a bonding pin in accordance with the principles of the present invention.
Figure 52B:
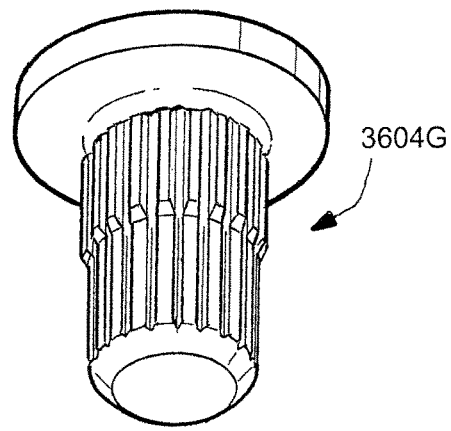
Figure 52C:
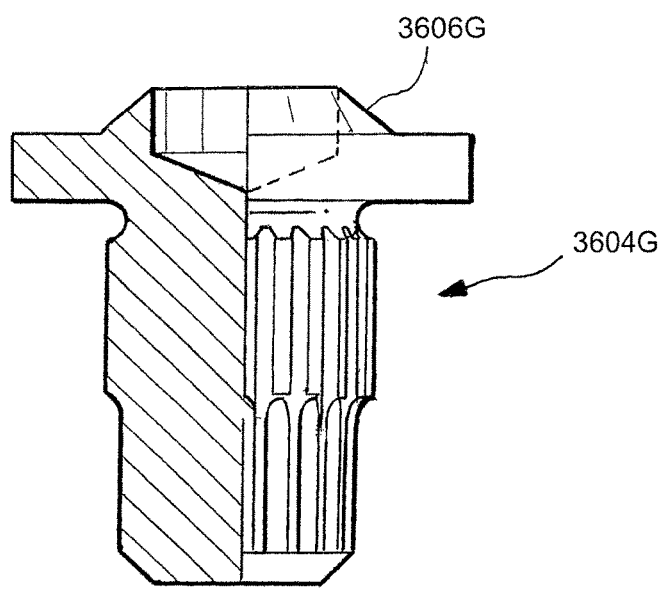

FIGS. 52A-C illustrate a further embodiment of a bonding pin in accordance with the principles of the present invention. As can be seen, bonding pin 3604G is also similar to the embodiment of FIGS. 45A-B and 46. As can be seen, a straight, slanted portion 3606G is included from the drilled hole to the overhanging lip portion.

Figure 53A:
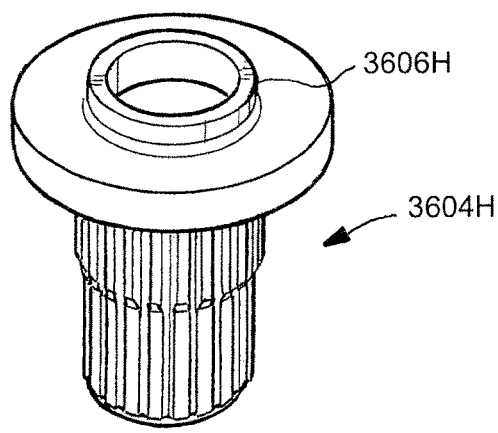
FIGS. 53A-C illustrate a ninth embodiment of a bonding pin in accordance with the principles of the present invention.
Figure 53B:
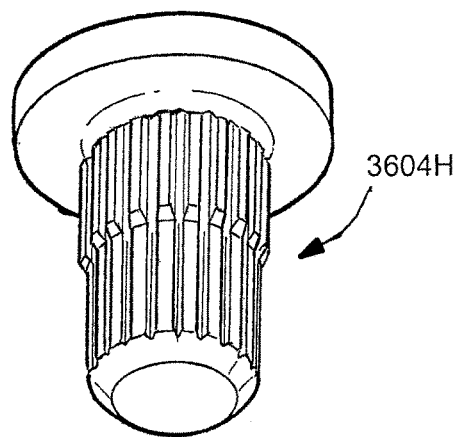
Figure 53C:
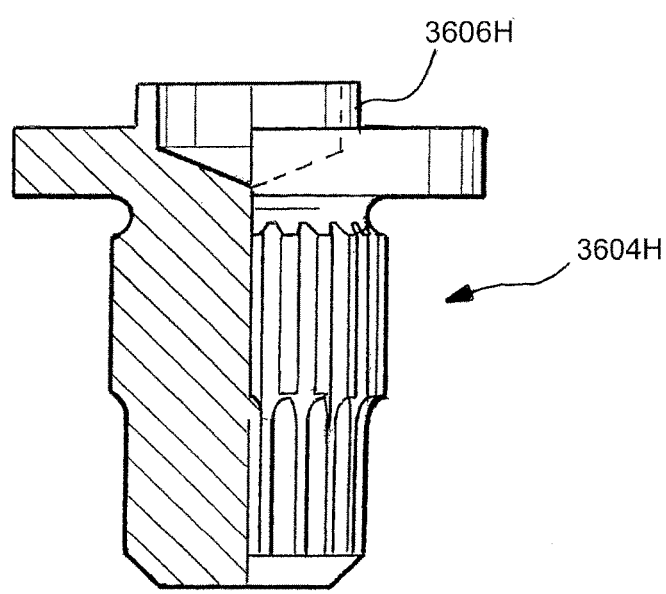

FIGS. 53A-C illustrate a further embodiment of a bonding pin in accordance with the principles of the present invention. As can be seen, bonding pin 3604H is also similar to the embodiment of FIGS. 45A-B and 46. As can be seen, a straight, vertical portion 3606H is used to further define the hole above the flat portion of the pin's head.

Figure 54A:
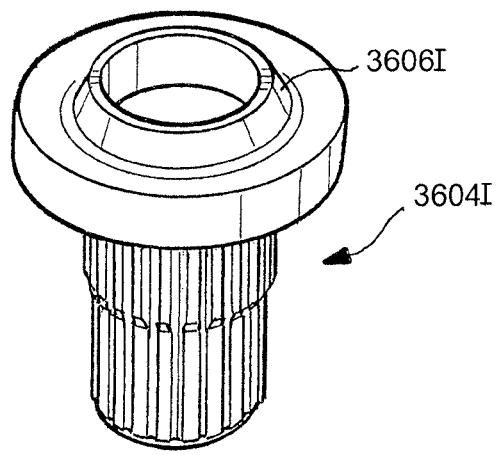
FIGS. 54A-C illustrate a tenth embodiment of a bonding pin in accordance with the principles of the present invention.
Figure 54B:
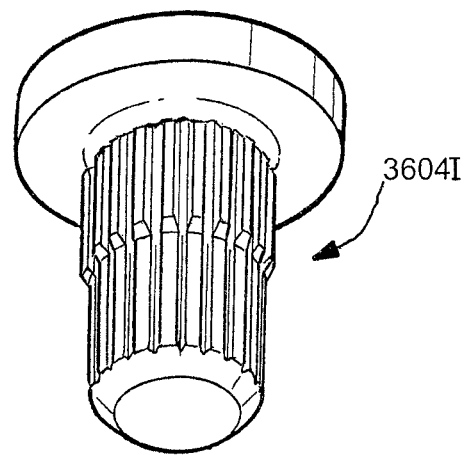
Figure 54C:
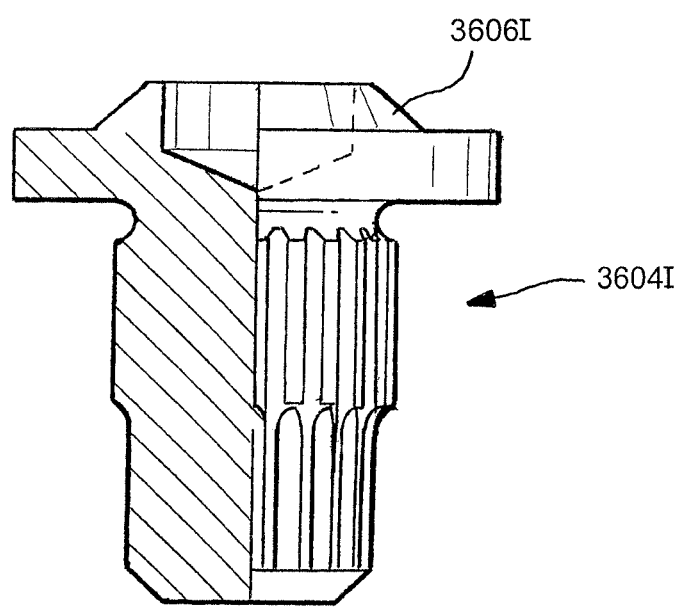
Figure 55A:
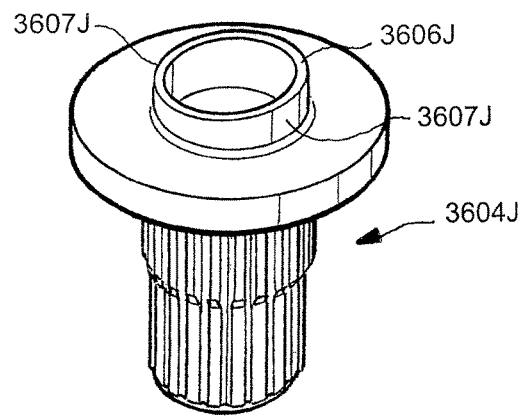
FIGS. 55A-D illustrate an eleventh embodiment of a bonding pin in accordance with the principles of the present invention.
Figure 55B:
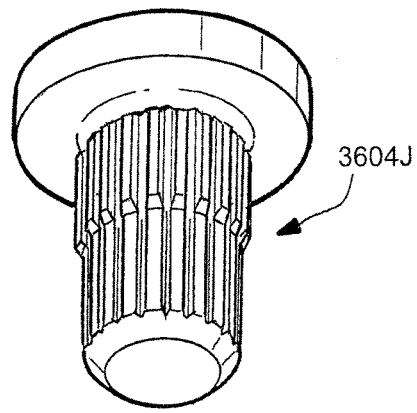
Figure 55C:
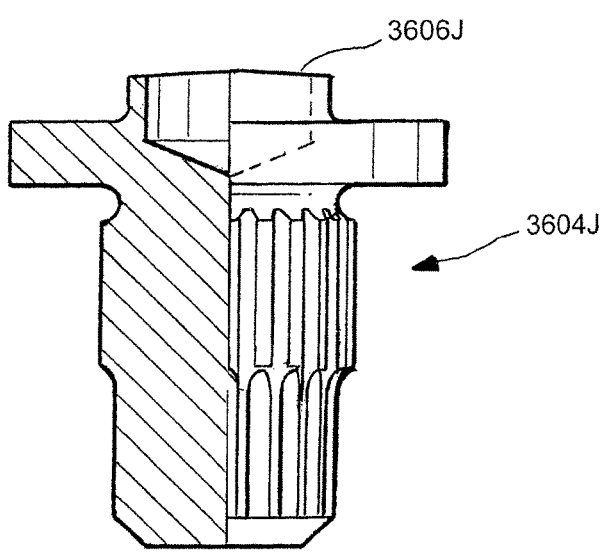
Figure 55D:
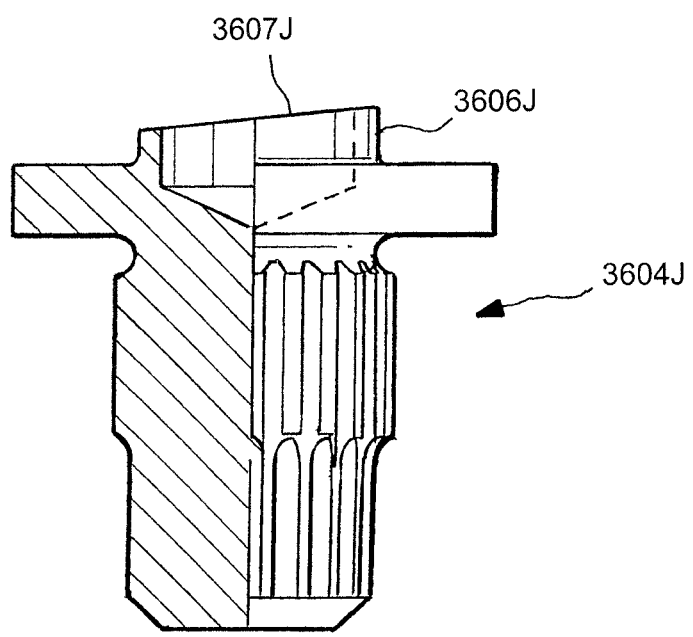

FIGS. 54A-C illustrate a further embodiment of a bonding pin in accordance with the principles of the present invention. As can be seen, bonding pin 3604I is similar to the embodiment of FIGS. 53A-C. As can be seen, a straight, slanted portion 3606I is used to further define the hole above the flat portion of the pin's head.

FIGS. 55A-D illustrate a further embodiment of a bonding pin in accordance with the principles of the present invention. As can be seen, bonding pin 3604J is similar to the embodiment of FIGS. 53A-C. However, this embodiment has a slanted slice 3607J that is cut out of the lip 3606J of the pin 3604J. This slanted slice 3607J can best be seen in FIG. 55D, which shows a slant from horizontal. The slant may be 15 degrees.

Figure 56A:
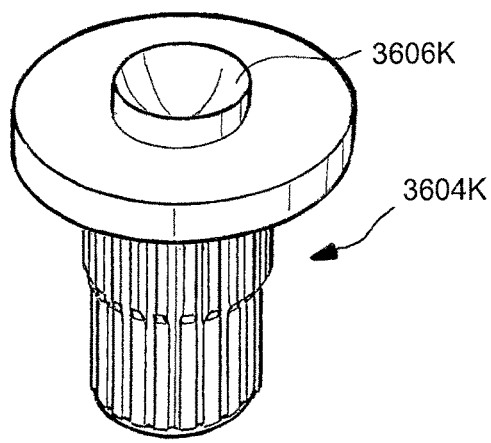
FIGS. 56A-C illustrate a twelfth embodiment of a bonding pin in accordance with the principles of the present invention.
Figure 56B:
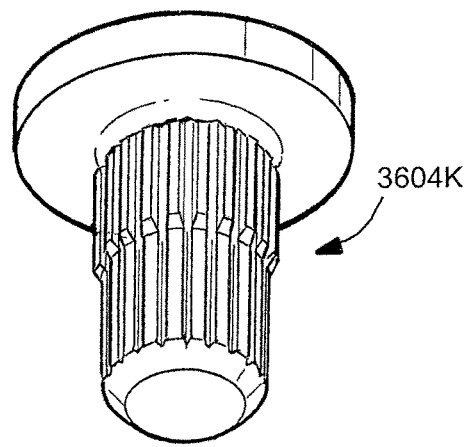
Figure 56C:
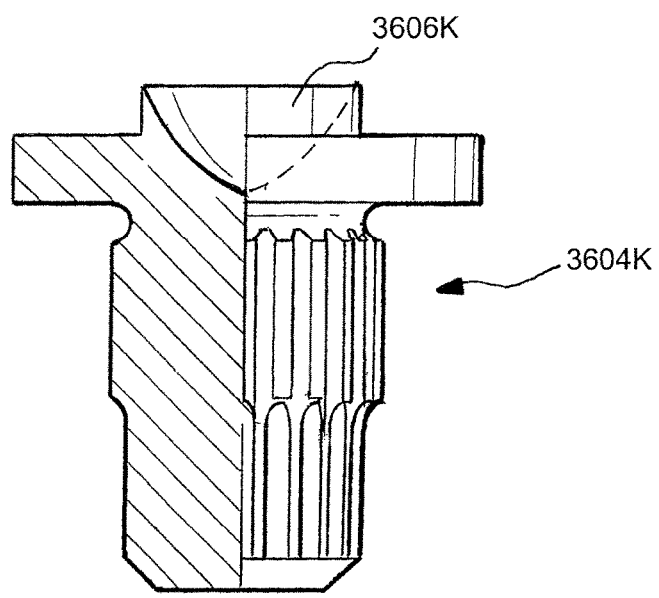

FIGS. 56A-C illustrate a further embodiment of a bonding pin in accordance with the principles of the present invention. As can be seen, bonding pin 3604K is similar to the embodiment of FIGS. 53A-C. However, the drilled hole 3606K has curved surfaces, e.g., egg-shaped surfaces, as opposed to the straight and slanted surfaces.

Figure 57A:
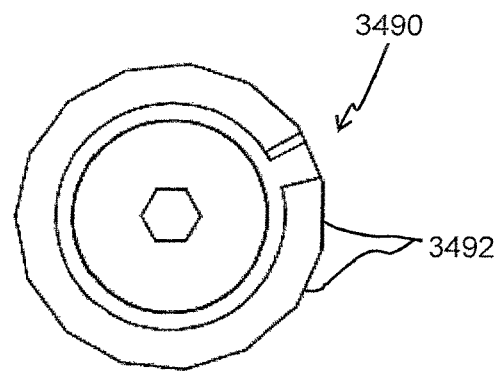
FIGS. 57A-C illustrate a fourth embodiment of a helical drive in accordance with the principles of the present invention.
Figure 57B:
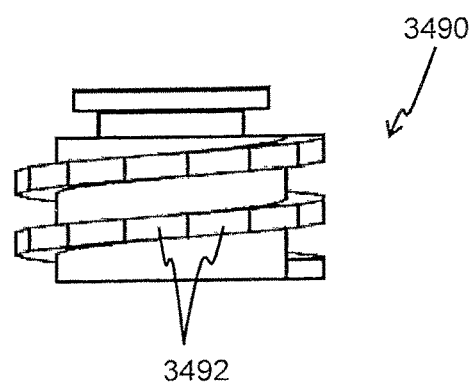
Figure 57C:
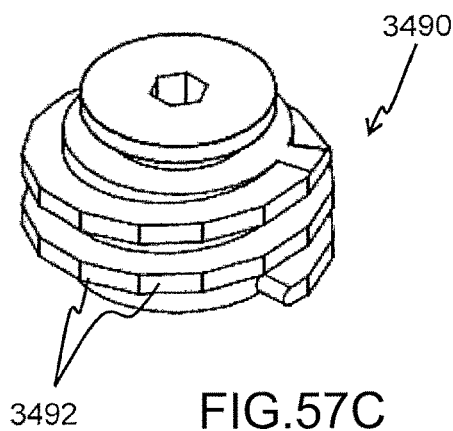

FIGS. 57A-C illustrate a fourth embodiment of a helical drive 3490 in accordance with the principles of the present invention. In this embodiment, the threads are not round, and thus, the drive is faceted with sides, e.g., 15-sides, with facets 3492 distributed evenly and uniformly around the circumference of the drive's helical threads. The effect of providing a plurality of flat sides (facets 3492) on the helical drive is to generate a moderate locking action that relies on friction between the drive and the stanchion to prevent unintended rotation of the drive when the assembly is subjected to vibration, e.g., from wind loading or handling. The number of sides/facets on the non-round helical drive 3490 can range from 5 to 20, with a preferred number being 15 sides.

FIGS. 58A-C illustrate a fifth embodiment of a helical drive in accordance with the principles of the present invention. In this embodiment, the helical drive 20000 includes a dual-drive element which is comprised by an external hex socket drive 20100 and an internal hex socket (Allen) drive 20200. Either type of tool (a hex socket drive or an Allen wrench tool) can be used to drive (rotate) helical drive 20000.

Figure 59:
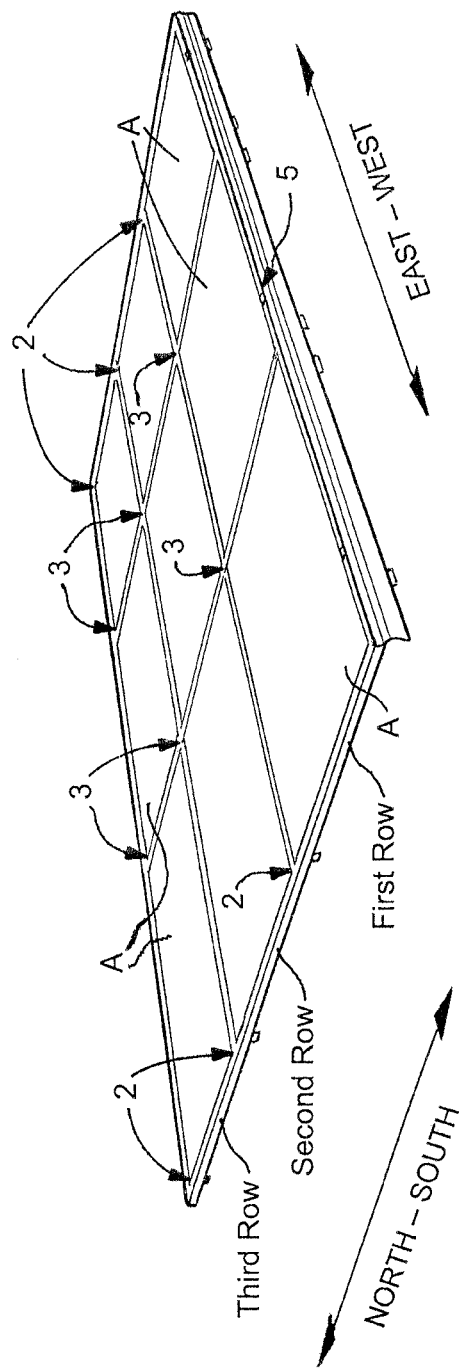
FIG. 59 is a perspective view of a hybrid solar panel mounting assembly that incorporates the height adjustable mounting assembly of the present invention.

Further in the accordance with the principles of the present invention, the height adjustable solar panel mounting assembly of the present invention can be used in combination with a hybrid solar panel mounting assembly, where the hybrid assembly includes a component of a rail-based mounting system and a component of a rail-less mounting system. An example of such a hybrid assembly is shown in FIG. 59, which shows a 3×3 solar panel array including micro-rail mounting assemblies 3, short micro-rail mounting assemblies 2, and a rail 5 on the first row of the assembly (the Southern-most location of the assembly). In the embodiment of FIG. 59, both the micro-rail mounting assemblies 3 and the short micro-rail mounting assemblies 2 can include height adjustable helical vertical drive mechanisms of the present invention. This allows the height of the solar panels to be adjusted after the panels have been installed in this hybrid layout.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A solar panel mounting assembly, comprising:
    a mounting bracket including an upper bracket and a lower bracket, the lower bracket including a first slot and a second slot;
    a stanchion including a first vertical arm opposite a second vertical arm, the first vertical arm and the second vertical arm each including teeth protruding from respective inside surfaces thereof, respective outside surfaces thereof being smooth and planar, and the teeth of the first vertical arm facing the teeth of the second vertical arm to define an open central region between the first vertical arm and the second vertical arm; and
    a helical drive element disposed inside of the open central region between the first vertical arm and the second vertical arm,
    wherein:
        the upper and lower brackets are coupled to the helical drive element wherein the mounting bracket is vertically adjustable by rotating the freestanding helical drive element,
        the first vertical arm is received by the first slot such that the first vertical arm passes through the first slot when the mounting bracket is vertically adjusted, and
        the second vertical arm is received by the second slot such that the second vertical arm passes through the second slot when the mounting bracket is vertically adjusted.

2. The solar panel mounting assembly according to claim 1, wherein the helical drive element includes an external helical thread extending from a bottom of the helical drive element to a top of the helical drive element.

3. The solar panel mounting assembly according to claim 1, wherein the teeth on the first vertical arm are vertically offset with respect to the teeth on the second vertical arm.

4. The solar panel mounting assembly according to claim 3, wherein:
the stanchion comprises an extruded, planar channel section having a selected longitudinal length,
the front and back surfaces of the channel section are defined by a pair of parallel planes that are separated by said selected longitudinal length, and
an outer diameter of the helical drive element extends radially beyond the first pair of parallel planes defining the front and back surfaces of the stanchion.

5. The solar panel mounting assembly according to claim 3, wherein an entirety of the helical drive element is disposed below a top of the stanchion.

6. The solar panel mounting assembly according to claim 1, further comprising:
a tool for rotating the helical drive element,
wherein the helical drive element is rotatable by inserting the tool into a recess in the helical drive element and rotating the tool.

7. The solar panel mounting assembly according to claim 6, further comprising:
a first hole disposed in the upper bracket and vertically aligned with a second hole disposed in the lower bracket, the first hole and the second hole for receiving at least a portion of the tool.

8. The solar panel mounting assembly according to claim 1, wherein the helical drive element is vertically movable before or after the assembly has been mounted to a roof.

9. The solar panel mounting assembly according to claim 1, further comprising:
a base, wherein the stanchion is coupled to the base.

10. The solar panel mounting assembly according to claim 9, wherein the stanchion is variably positionable along a horizontal longitudinal length of the base.

11. The solar panel mounting assembly according to claim 9, wherein the base has a length such that no cutting of shingles is required when installing the base on a composition roof with shingles.

12. The solar panel mounting assembly according to claim 9, wherein the base includes an aperture, and
wherein a lag screw is disposable through the aperture for mounting the base on a roof.

13. The solar panel mounting assembly according to claim 9, wherein the base includes a horizontal hollow channel that is disposed along a longitudinal length of the base.

14. The solar panel mounting assembly of claim 9, wherein the stanchion comprises a hook for locking the stanchion onto a side of the base.

15. The solar panel mounting assembly according to claim 1, wherein the upper bracket is coupled to the lower bracket, and the upper bracket is positioned directly above the lower bracket.

16. The solar panel mounting assembly according to claim 15, wherein an entirety of the helical drive element is disposed below the lower bracket.

17. The solar panel mounting assembly according to claim 15, wherein the lower bracket includes a coupler which couples the helical drive element to the lower bracket.

18. The solar panel mounting assembly according to claim 15, wherein:
a horizontal slot is disposed across a width of the lower bracket, and
a lower end of a vertical wall of the upper bracket is disposed in the horizontal slot.

19. The solar panel mounting assembly according to claim 15, wherein:
the lower bracket includes a first stiffening web and a second stiffening web,
the first stiffening web is attached to a first arm of the lower bracket, and
the second stiffening web is attached to a second arm of the lower bracket.

20. The solar panel mounting assembly of claim 15, wherein the upper bracket and the lower bracket are a single, monolithic, integrated structure.

21. The solar panel mounting assembly of claim 15, wherein the upper and lower brackets are not mirror images of each other.

22. The solar panel mounting assembly according to claim 1, wherein the mounting bracket includes a first panel slot and a second panel slot, and
a first solar panel is mountable in the first panel slot and a second solar panel is mountable in the second panel slot.

23. The solar panel mounting assembly according to claim 1, wherein the helical drive element is vertically movable along a vertical length of the stanchion between the first vertical arm and the second vertical arm, before or after the stanchion has been attached to a base that is mounted to a roof.

24. The solar panel mounting assembly according to claim 1, wherein the helical drive element has an aspect ratio of a vertical height to an outer diameter that ranges from 0.8 to 1.2.

25. The solar panel mounting assembly according to claim 1, wherein the helical drive element has an aspect ratio of an inner diameter to an outer diameter that ranges from 0.5 to 0.9.

26. The solar panel mounting assembly according to claim 1, wherein the helical drive element includes a square thread that has a pitch length ranging from 0.1 to 1.0 inches/thread.

27. The solar panel mounting assembly according to claim 1, wherein the helical drive element has a plurality of circumferential facets on a helical thread of the helical drive element.

28. The solar panel mounting assembly according to claim 1, further comprising:
a bonding pin disposed in the lower bracket of the mounting bracket,
wherein an electrical connection is establishable between a solar panel that is installed in the mounting bracket and the mounting bracket by the bonding pin.

29. The solar panel mounting assembly according to claim 1, wherein the mounting bracket includes an arm and a micro-inverter is mountable on the arm.

30. The solar panel mounting assembly according to claim 1, wherein the stanchion includes a horizontal bridge that extends across from a top of the first vertical arm of the stanchion to a top of the second vertical arm of the stanchion.

31. The solar panel mounting assembly according to claim 1, wherein
the first vertical arm and the second vertical arm are disposed between two parallel planes.

32. The solar panel mounting assembly of claim 1, wherein the helical drive element has an external helical thread that wraps around a cylindrical core.

33. The solar panel mounting assembly of claim 1, wherein the stanchion is an extruded, hollow, U-shaped channel section.

* * * * *